Aug. 7, 1945.  H. D. STEVENS  2,381,379
TIRE BUILDING APPARATUS
Filed July 17, 1940  12 Sheets-Sheet 1

INVENTOR
Horace D. Stevens
BY Ely & Frye
ATTORNEYS

Aug. 7, 1945.　　　　H. D. STEVENS　　　　2,381,379
TIRE BUILDING APPARATUS
Filed July 17, 1940　　　　12 Sheets-Sheet 2
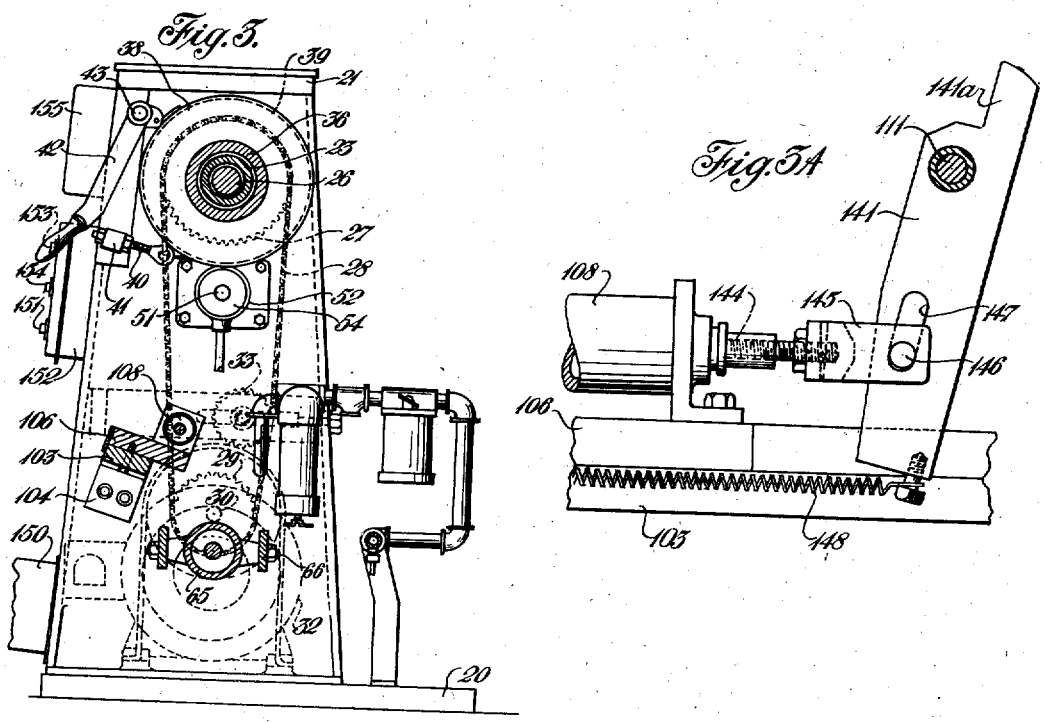
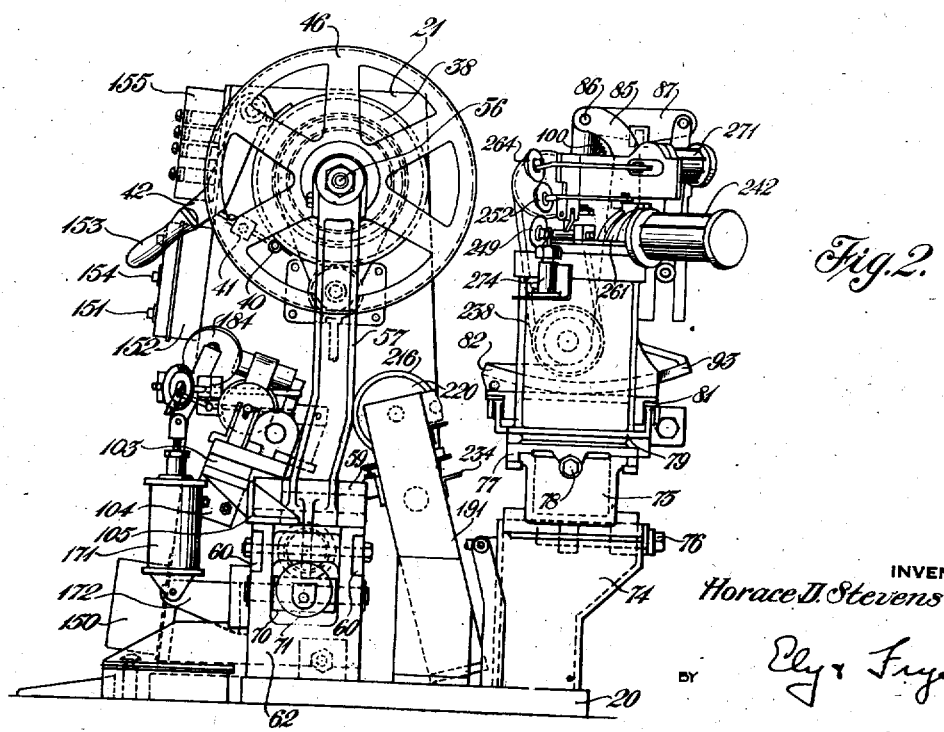
INVENTOR
Horace D. Stevens
BY Ely & Frye
ATTORNEYS Aug. 7, 1945.   H. D. STEVENS   2,381,379
TIRE BUILDING APPARATUS
Filed July 17, 1940   12 Sheets-Sheet 3

INVENTOR
Horace D. Stevens
BY
Ely & Frye
ATTORNEYS

Aug. 7, 1945.   H. D. STEVENS   2,381,379
TIRE BUILDING APPARATUS
Filed July 17, 1940   12 Sheets-Sheet 4
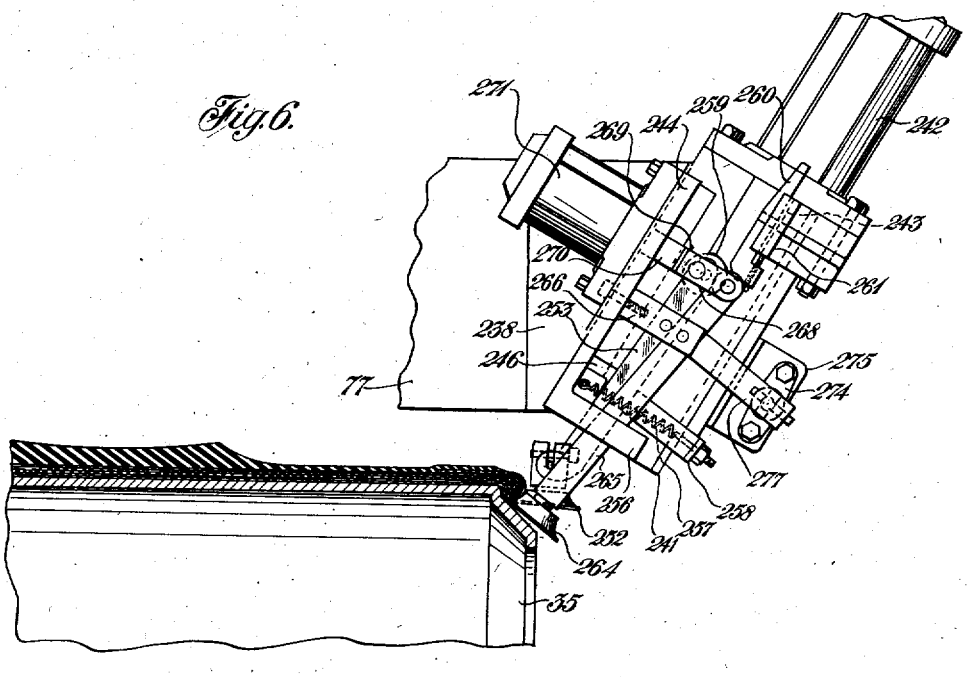
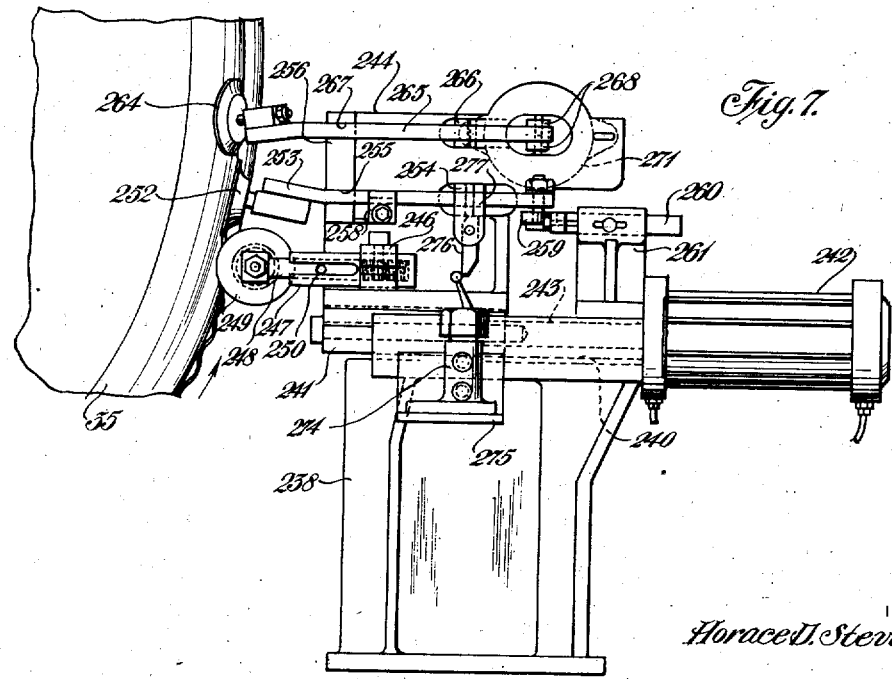
INVENTOR
Horace D. Stevens
BY
Oly & Frye
ATTORNEYS Aug. 7, 1945. H. D. STEVENS 2,381,379
TIRE BUILDING APPARATUS
Filed July 17, 1940 12 Sheets-Sheet 5
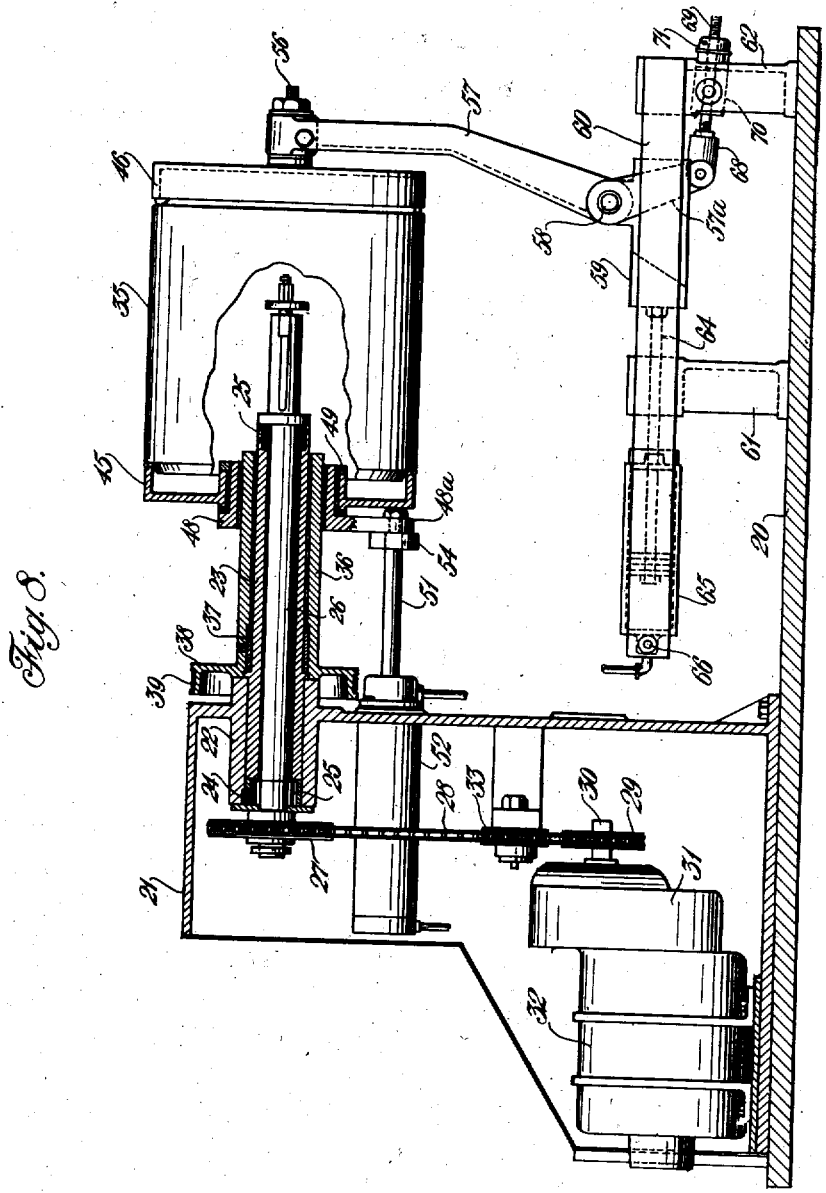
INVENTOR
Horace D. Stevens
BY
Ely & Frye
ATTORNEYS

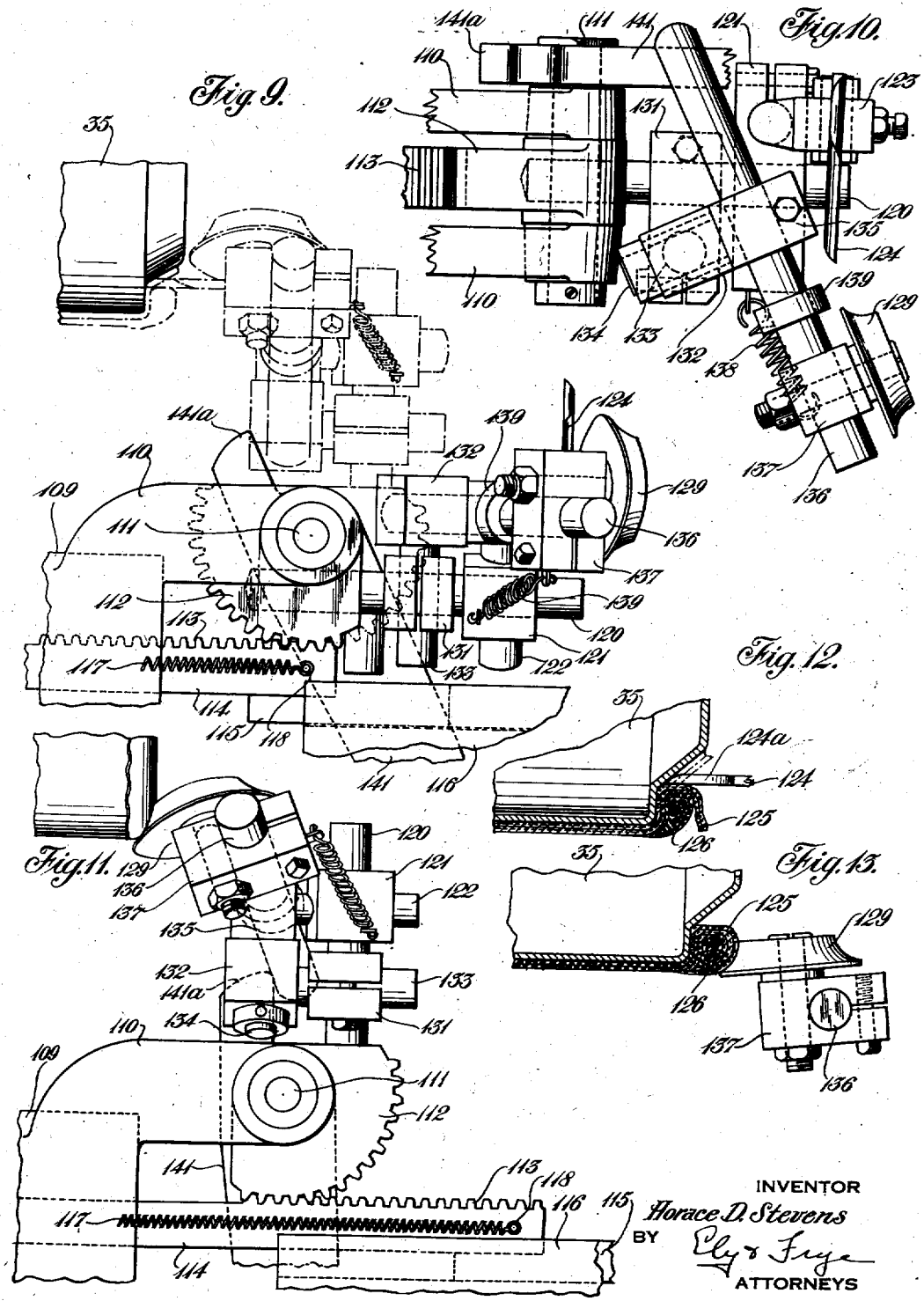

Aug. 7, 1945.　　　H. D. STEVENS　　　2,381,379
TIRE BUILDING APPARATUS
Filed July 17, 1940　　　12 Sheets-Sheet 7

INVENTOR
Horace D. Stevens
BY
ATTORNEYS

Aug. 7, 1945.  H. D. STEVENS  2,381,379
TIRE BUILDING APPARATUS
Filed July 17, 1940    12 Sheets-Sheet 8

INVENTOR
Horace D. Stevens
Ely & Frye
ATTORNEYS

Aug. 7, 1945.  H. D. STEVENS  2,381,379
TIRE BUILDING APPARATUS
Filed July 17, 1940   12 Sheets-Sheet 9
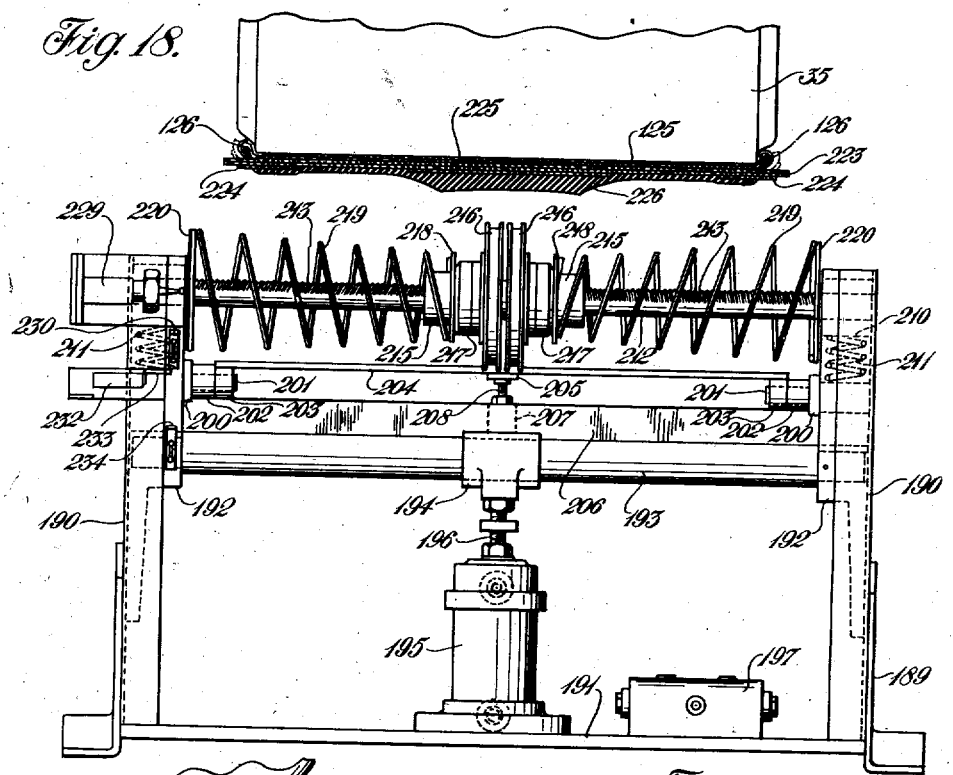
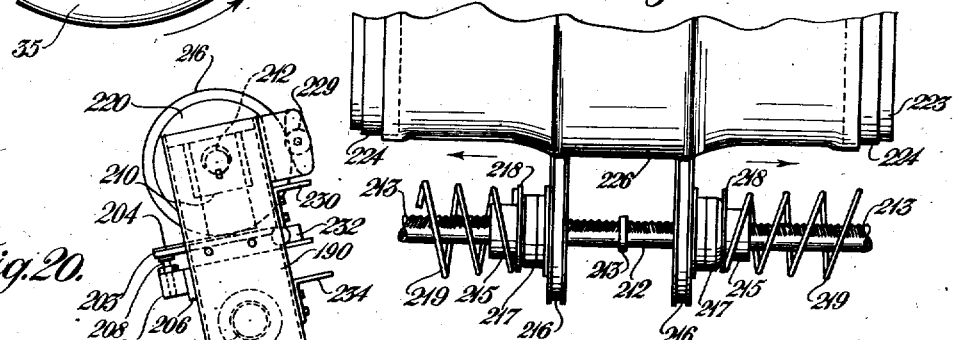
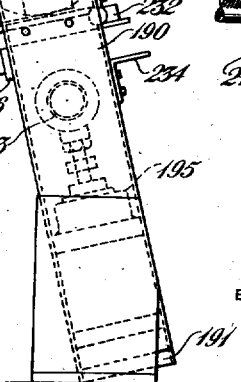
INVENTOR
Horace D. Stevens
BY
ATTORNEYS

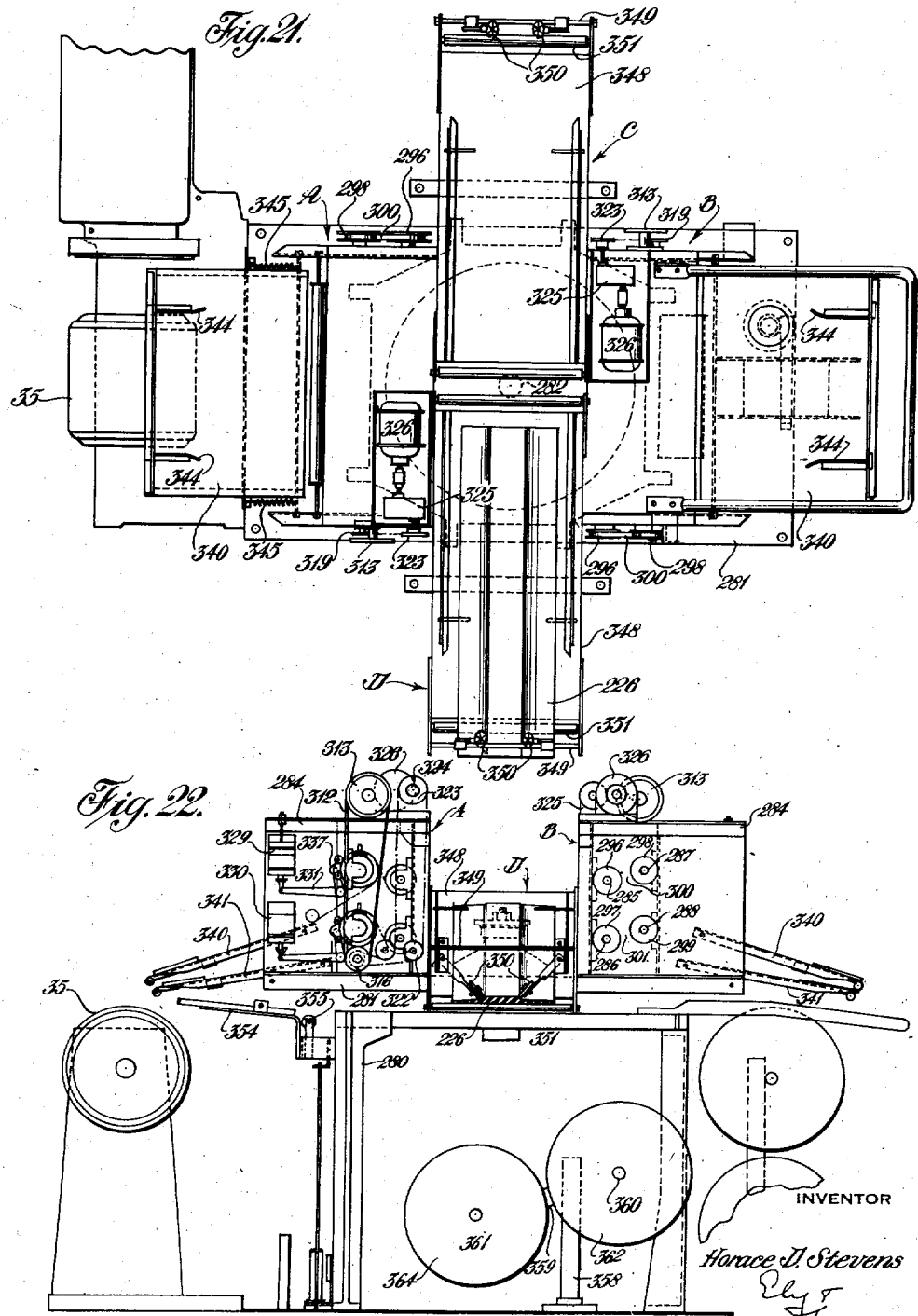

Aug. 7, 1945.  H. D. STEVENS  2,381,379
TIRE BUILDING APPARATUS
Filed July 17, 1940  12 Sheets-Sheet 11
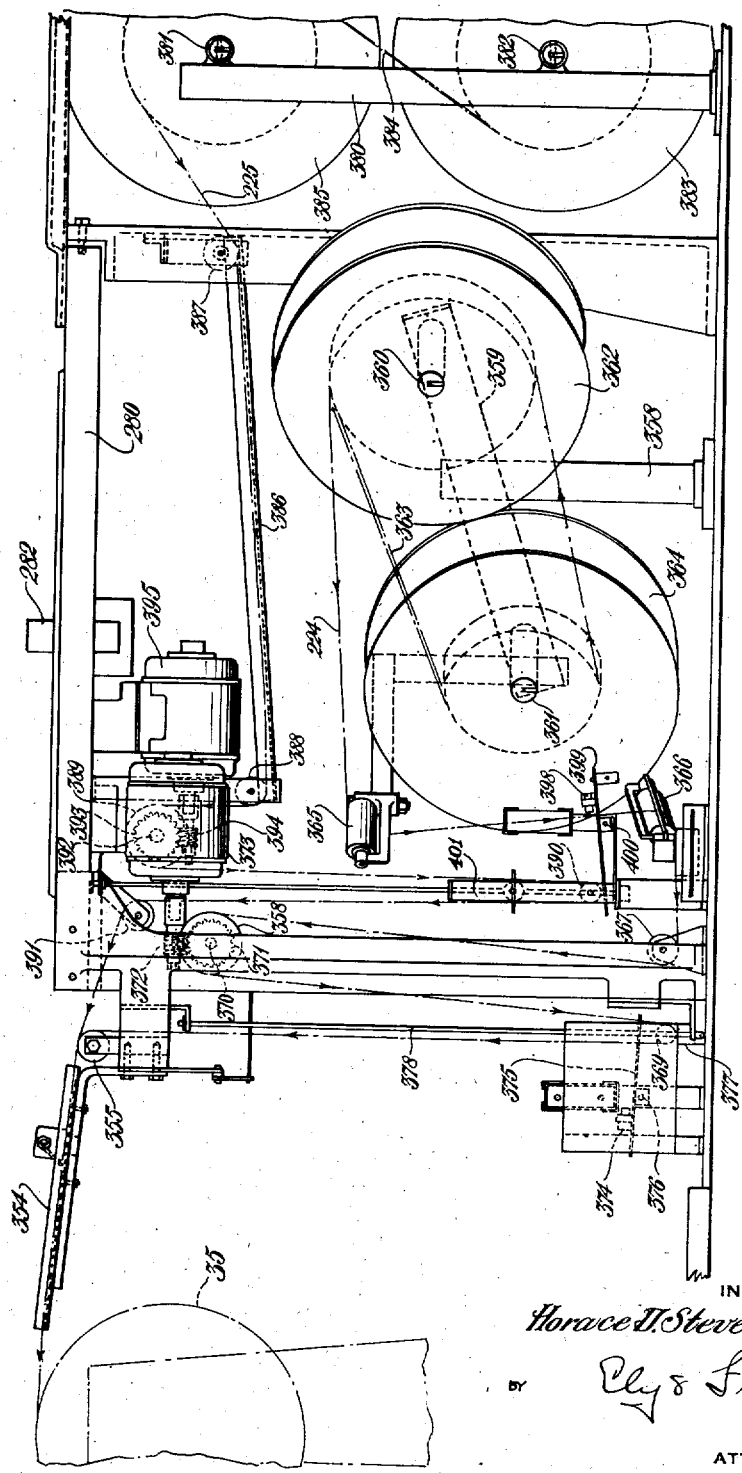
INVENTOR
Horace H. Stevens
BY
Ely & Frye
ATTORNEYS

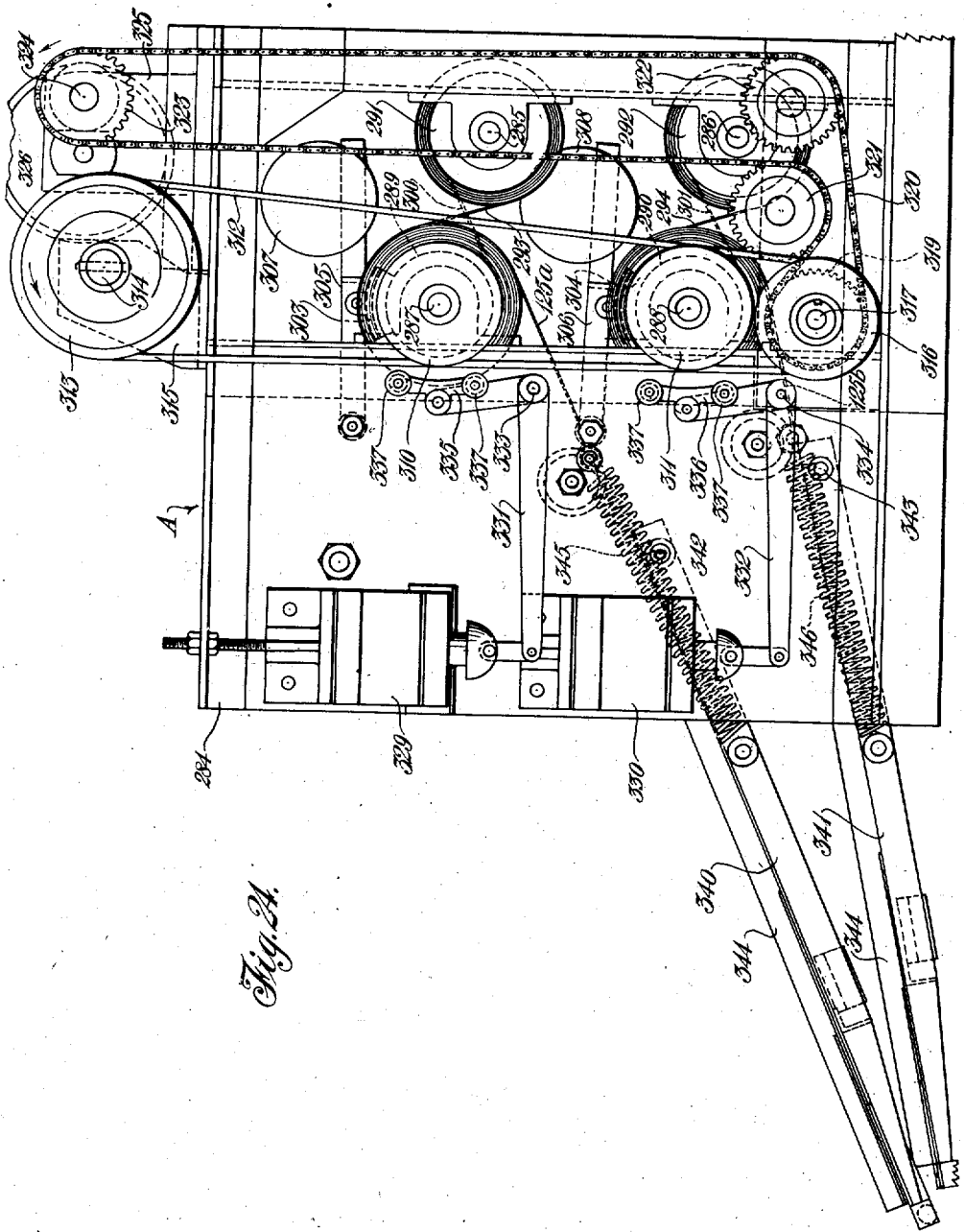

Patented Aug. 7, 1945

2,381,379

UNITED STATES PATENT OFFICE 2,381,379

TIRE BUILDING APPARATUS

Horace D. Stevens, Akron, Ohio, assignor to The Firestone Tire & Rubber Company, Akron, Ohio, a corporation of Ohio Application July 17, 1940, Serial No. 345,974

5 Claims. (Cl. 154—10)

This invention relates to tire building apparatus, and more especially it relates to apparatus for fabricating pneumatic tire casings by the "flat band" method.

The chief object of the invention is to conserve time and manual labor in the manufacture of tire casings of the character mentioned. More specifically, the invention aims to provide novel mechanisms for performing different tire building operations; and to provide automatically for operating certain of said mechanisms in determinate sequence. Other objects will be manifest as the description proceeds.

Briefly stated, the apparatus of the invention comprises a power driven, reversible tire building drum that is of the collapsible type and is collapsed by means of a brake that is applied to a sleeve on the rotatable spindle that supports and drives the drum. Positioned adjacent the drum are stitchers for rolling down the first and second fabric plies of a tire being constructed on the drum, at the bead regions thereof, said stitchers being of the "spring" type, that is, they consist of endless helical springs that are mounted on sheaves and are movable longitudinally upon engagement with the work. The apparatus also comprises a pair of bead placing rings that are movable into engagement with the respective ends of the drum for mounting the tire beads thereon. Another device associated with the drum is a pair of "turn up" elements of plow shape that turn the under-bead fabric plies up around the beads after the latter are applied. Means also is provided for operating the said spring stitchers, bead placing rings, and "turn up" devices automatically in determinate sequence. Also positioned adjacent the drum and operable thereagainst is a tread stitching device and a side wall rolling device that operate concurrently, and a stitching device for turning the over-bead fabric plies of the tire about the beads thereof, the last mentioned stitching device operating automatically at the conclusion of operation of the tread stitching device. At the rear of the tire building drum is a rotatable stock-supply rack that carries a supply of tire-body fabric, chafer strips, breaker strip, and tread slabs for application to the drum during the fabrication of a tire thereon.

The foregoing elements of the apparatus and the operation thereof will be described in detail in the following specification, and are illustrated in the accompanying drawings, of which:

Figure 2 is an end elevation thereof as viewed from the right of Figure 1, the bead setting device being shown in operative position;

Figure 3 is a section on the line 3—3 of Figure 1;

Figure 3A is a fragmentary detail elevation of one of the fluid pressure cylinders of the apparatus, as viewed from the rear thereof;

Figure 6 is a plan view of one of the stitching devices that folds the over-bead plies around the beads;

Figure 7 is a side elevation of the structure shown in Figure 6;

Figure 8 is a side elevation, partly in section, of the tire building drum and its driving means, and the bead placing rings of the apparatus, said rings being shown in bead placing position;

Figure 9 is a front elevation, on a larger scale, of one of the devices that turn the under-bead fabric plies around the beads after the latter have been applied to the drum, the device being shown in inoperative position in full lines, and in its initial operative position in broken lines;

Figure 10 is a plan view of the device shown in Figure 9 in its inoperative position;

Figure 11 is front elevation of the device shown in Figure 9 in its final operative position;

Figure 12 is a detail sectional view showing the action of one of the turn-up tools on the work;

Figure 13 is a detail sectional view showing the action of another turn-up tool on the work;

Figure 18 is a front elevation of the tread stitching device of the apparatus, in inoperative position;

Figure 19 is an elevation of the work-engaging elements of Figure 18 shown in work-engaging or operative position;

Figure 20 is an end elevation of the tread stitching device shown in Figure 18, as viewed from the right thereof;

Figure 21 is a plan view of a stock-storage rack positioned at the rear of the tire building drum;

Figure 22 is a side elevation of the stock-storage rack as viewed from the near side of Figure 21;

Figure 23 is a detail elevational view of the lower part of the stock-storage rack showing the arrangement for storing and delivering tread reinforce strip material and chafer strip material; and Figure 24 is a side elevation of a stock-storage unit of the rack utilized for storing and delivering the body plies of fabric.

Figure 1:
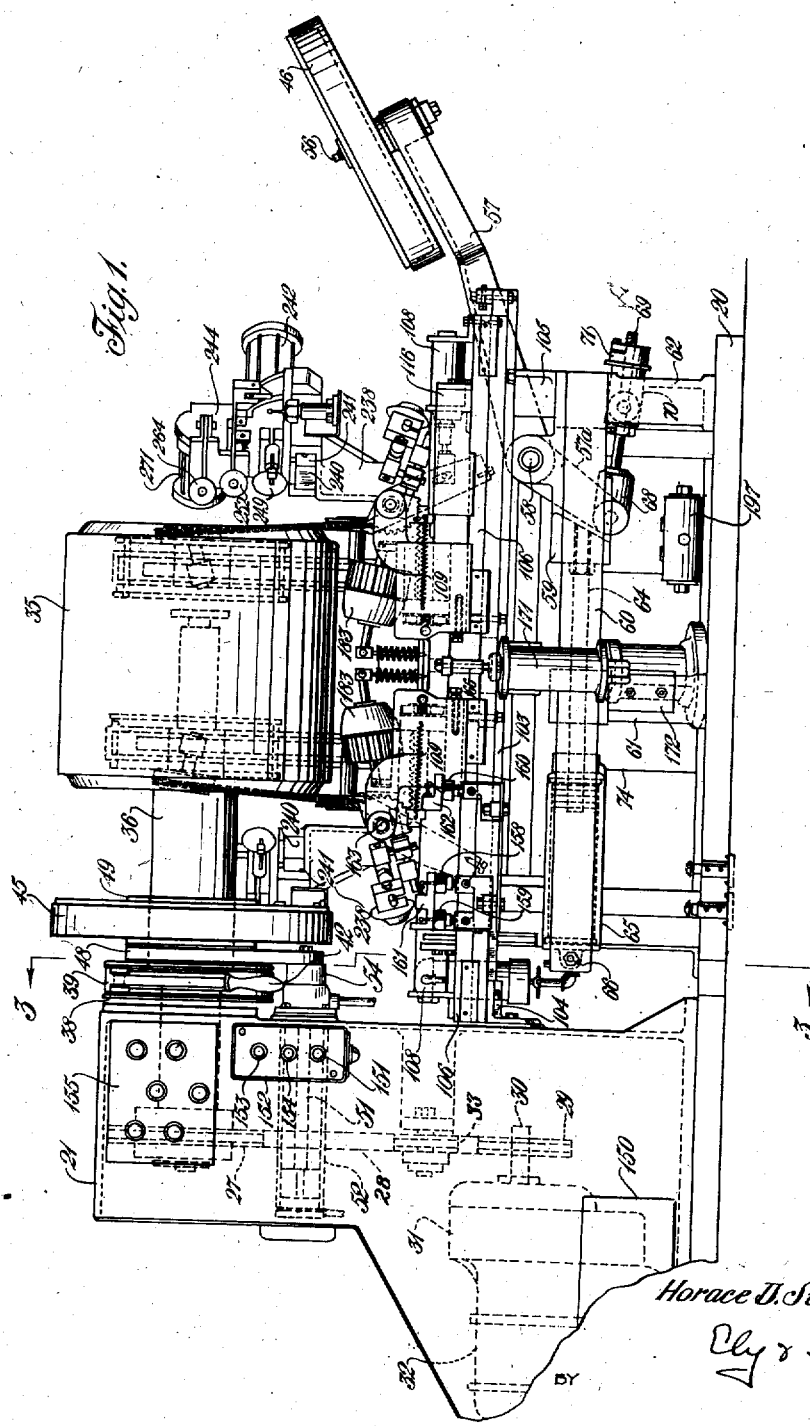
Figure 1 is a front elevation of apparatus embodying the invention, in inoperative position, the stock-supply rack at the rear thereof being omitted.

Referring now to the drawings, particularly Figures 1 and 8 thereof, it will be seen that the apparatus comprises a bed plate 20 at one side of which is mounted an upright housing 21. Formed in the upper part of the latter is a horizontally disposed tubular bracket 22, and mounted in the latter is a sleeve or quill 23 that projects laterally from the housing 21, over said base plate 20, said quill being secured against rotation by a set screw 24. Journaled in bearings 25, 25 at the respective ends of quill 23 is a driving spindle 26 that projects beyond the opposite ends of the quill, the projecting end thereof within housing 21 being provided with a sprocket 27. Trained about the latter is a sprocket chain 28 that also is trained about a driving sprocket 29 on the shaft 30 of a speed reducing device 31 that is coupled to a reversible motor 32, the motor being located in the bottom of housing 21. An adjustable idler gear 33 is provided for keeping the sprocket chain 28 taut.

Mounted upon the other end of the spindle 26, exteriorly of the housing 21, is an annular collapsible tire building form or drum 35 having the usual shoulders at its opposite ends. Said form or drum 35 is of a standard construction, well known to the trade, so that it is not believed necessary to show and describe herein the details of the mechanism that effects collapse thereof other than to say that collapsing of the drum, and subsequent restoration thereof to annular shape, is effected by means of relative angular movement between the spindle 26 and a tubular sleeve 36 that is journaled upon the quill 23, exteriorly thereof, a bearing bushing 37 being interposed between said quill and sleeve. The outer end of the sleeve 36 extends into the drum 35 and is connected to the collapsing mechanism thereof by suitable means (not shown). The opposite end of the sleeve 36 abuts the outer end of bracket 22, and is formed thereat with an integral brake drum 38 that is embraced by a brake band 39. One end of the latter is connected to an eye-bolt 40 that is adjustably mounted in an anchoring structure 41 fixed upon the housing 21. At its other end the brake band 39 is secured to one arm of an angular brake lever 42 that is pivotally mounted at its elbow at 43 upon the housing 21, the other arm of the lever constituting a hand-grip portion. The arrangement is such that when the hand-grip portion of the lever 42 is pulled forwardly, the brake band 39 is tightened about the brake drum, with the result that if the brake drum is being rotated in the direction that it normally rotates during the building of a tire, relative rotative movement of the spindle 26 and brake-sleeve 36 will effect collapse of the drum. When it is desired to expand the collapsed drum, the latter is rotated in the opposite direction and the brake thereafter again applied, as is well understood in this art.

The mounting of tire beads upon the drum 35, during the building of a tire thereon, is effected by means of respective bead-placing rings 45, 46 that are positioned at opposite ends of the drum, normally in spaced relation thereto, and movable into engagement therewith. Each bead ring is formed with a peripheral groove on the margin thereof nearest the drum, which groove receives a tire bead that is placed therein at the beginning of a tire building operation, the bead adhering to the tire fabric on the drum, when applied thereto, by reason of its natural tackiness.

Bead-placing ring 45, which is designated the "inner" bead ring because it is disposed nearest the housing 21, is rotatably journaled upon the axial hub of a ring holder 48, and retained thereon by means of a collar 49 on said hub. Said holder 48 is mounted upon the sleeve 36 and is capable of sliding movement longitudinally thereof, said sleeve being rotatable relatively of said holder. For effecting axial movement of the holder 48, said holder is formed with a downwardly extending arm 48a to which is connected the piston rod 51 of a double-acting fluid pressure operated cylinder 52, the latter being mounted upon a wall of the housing 21 and being located interiorly thereof. A rubber bumper 54 is mounted upon the piston rod 51 for cushioning the impact of the arm 48a against the adjacent cylinder head.

The "outer" bead ring 46 is journaled upon a stud 56 carried at the free end of a ring holder 57 that consists of a slightly angular lever arm that is pivotally mounted at 58 upon a slide 59, the latter being carried by and between a pair of spaced-apart horizontal slide-bars or rails 60, 60 that are supported by a pair of brackets, 61, 62 mounted upon the bed plate 20. The slide 59 is positioned between the brackets 61, 62, and its movement in one direction is limited by bracket 62. For moving the slide 59 longitudinally of the rails 60, said slide is connected at one of its ends to the piston rod 64 of a double-acting fluid pressure operated cylinder 65, the latter being supported at its rear end by a rod 66 carried by and between the rails 60, at the ends thereof nearest the housing 21. The ring-holder arm 57 has a portion 57a that extends downwardly through a slot in slide 59, below the pivotal connection 58, the free end of said portion 57a being connected to a clevis 68 having a stem 69 that extends through a swivel 70, the latter being pivotally carried by the bracket 62. The end portion of stem 69 has an adjusting sleeve 71 threaded thereon, thereby enabling adjustment of the clevis 68 relatively of the swivel 70.

The arrangement is such that the arm 57 constitutes a lever of the third class, the fulcrum of the lever being at the clevis 68 and power being applied to the lever at the pivot point 58. Thus it will be seen that by charging opposite ends of the cylinder 65 the slide 59 may be reciprocated, thereby moving the lever arm 57 between the inoperative position shown in Figure 1 and the operative, bead applying position shown in Figures 2 and 8. The operation of the cylinder 65 is effected concurrently with the operation of cylinder 52 so that both bead rings are applied to the drum 35 at the same time.

In the building of a tire upon the drum 35, the first step is the application of two plies of tire building fabric to the drum, which plies commonly are called "under bead" plies. The next step is the rolling down or stitching of the lateral marginal portions of said plies so that they conform to the shoulders or reduced portions of the drum at opposite ends thereof. The rolling down of the under bead plies as described is effected by a pair of "spring" stitchers, the same being best shown in Figures 4 and 5. The mechanism referred to as "spring stitchers" is essentially the same as that shown in U. S. Patent No. 1,981,828, issued November 20, 1934, to F. J. Shook. For this reason only a brief description of the mechanism will be given, and no claim to the mechanism per se will be made.

Figure 4:
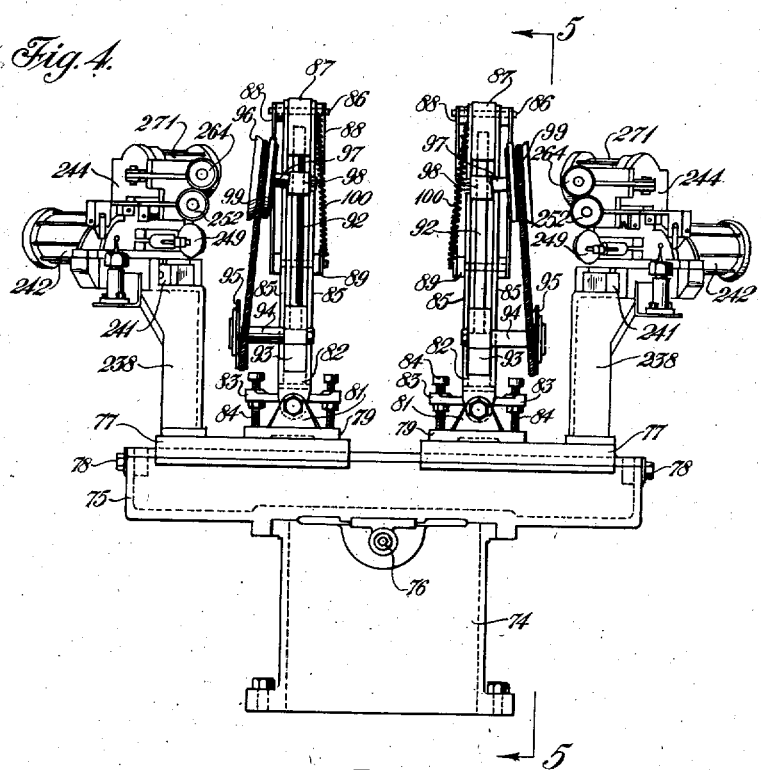
Figure 4 is a front elevational detail showing the "spring" stitchers, and the stitchers that fold the over-bead fabric plies around the beads.

As shown in Figures 2 and 4, the stitching mechanism mentioned is located at the rear of the drum 35 and comprises a standard 74 that is mounted upon bed plate 20, and slidably mounted upon the top of said standard is an elongated base member 75, the latter being adjustable transversely, in a fore and aft direction, so as to approach or recede from the drum 35, an adjusting screw 76 being provided for this purpose. The top of the base member 75 is formed as a slideway for a pair of spaced apart slides 77, 77 that are positioned at opposite sides of the centerline of the standard 74, and are individually adjustable longitudinally of their slideway by means of respective adjusting screws 78. Mounted upon the tops of slides 77, near the adjacent ends thereof, are respective turntables 79 that have limited angular adjustability. Each of said turntables carries a stitching device, and, since the latter are identical, a description of one of them will be sufficient.

Each turntable 79 is formed at diametrically opposite points with upwardly extending lugs or ears 81, 81 that pivotally support a guide structure 82, and the latter is formed with arms 83, 83 that project laterally at right angles to the pivotal axis of the structure, on opposite sides of said axis, and have respective set screws 84 threaded through their free ends. The screws 84 engage the top of the turntable 79 and provide means for adjusting the position of the guide structure angularly upon its horizontal pivot on the turntable. The guide structure comprises a pair of upwardly extending parallel, spaced apart side plates 85, 85, the upper ends of which are curved toward the drum 35 and carry a pivot pin 86, there being a bell crank lever 87 journaled on the latter between said side plates. One arm of the bell crank lever extends rearwardly and is connected by a pair of links 88, 88 to a cross head 89 formed on the outer end of the piston rod of a one way fluid pressure operated cylinder 90 that is carried by the side plates 88.

The other arm of the bell crank lever 87 carries a rod 92 that extends substantially downwardly and at its lower end carries a slipper 93 that is slidably mounted in an arcuate guide slot formed in the guide structure 82, between the side plates 85 thereof, the slot being of such length that the slipper remains therein in all positions of the bell crank 87. The slipper 93 carries a laterally projecting stub-shaft 94 on which is journaled a peripherally grooved sheave 95, and a similar sheave 96 is journaled on a stub-shaft 97 that is carried by a block 98 that is slidably mounted for angular and longitudinal adjustability upon the rod 92, at a suitable distance above the sheave 95. Trained about the sheaves 95, 96 is an endless, extensible, tire building tool 99 consisting of an endless coiled spring.

Figure 5:
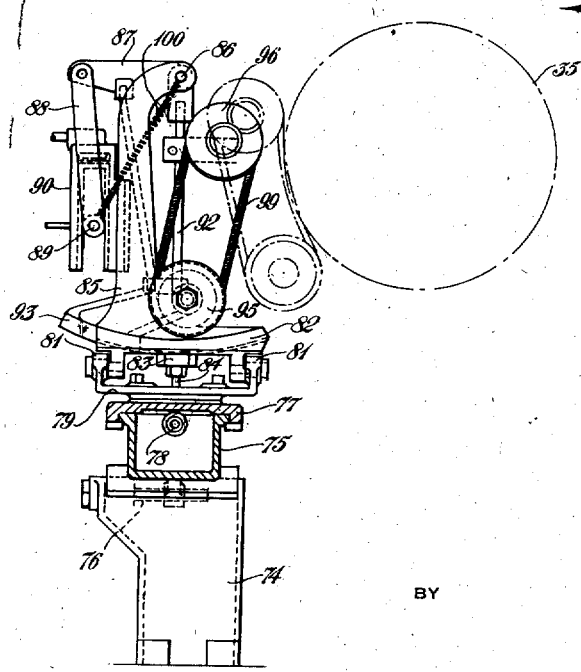
Figure 5 is a section on the line 5—5 of Figure 4 showing the "spring" stitchers in side elevation.

The arrangement is such that charging of the cylinder 90 swings the bell crank lever 87 in such manner as to move the spring tool 99 from the inoperative position shown in full lines in Figure 5 to the operative position shown in broken lines in the same figure, wherein said tool engages the work on the drum 35. By reason of the adjustability of the various elements that support the tools 99, it is possible to position them exactly as desired with relation to the drum 35. As is best shown in Figure 4, the spring stitchers 99 are not parallel to each other and to the plane of the drum 35, but are somewhat obliquely disposed so as to engage the tire plies on the drum at the largest diameter of the latter, and progressively to fold the marginal portions of the fabric down over the shoulders of the drum at the opposite ends of the latter, the spring tools moving longitudinally, about the sheaves 95, 96, as they are frictionally driven by rotation of the drum. Tension springs 100 connected to the respective pivot pins 86 and cross heads 89 assist gravity in restoring the spring stitchers to inoperative position when the cylinders 90 are discharged. The spring stitchers are arranged to operate concurrently with each other, and in determinate time relation to other devices of the apparatus as presently will be explained.

After the first two fabric plies are applied to the drum 35, the margins of said plies stitched down over the shoulders of the drum by the spring stitchers 99 as described, and the tire beads mounted on the shoulders of the drum by the bead-setting devices previously described, it is next required that the marginal portions of the underbead fabric plies be turned up about the beads, which operation is performed by a pair of turn-up devices shown in their entirety in Figure 1, and shown in detail, on a larger scale, in Figures 9 to 15 inclusive.

Referring first to Figure 1, there is shown a supporting structure for a pair of the ply turn-up devices, which structure consists of a relatively narrow and elongated beam 103 that rests at one end upon an angle 104 secured to the housing 21, and at its other end rests upon a bracket 105 mounted atop of the bracket 62. Mounted on the top side of beam 103, at opposite ends thereof, are respective slide bars 106, 106, which slide bars are somewhat wider than the beam 103 at their ends nearest the ends of the beam. Each of said slide bars supports one of the ply turn-up devices, the latter being identical in construction and operation, and located at opposite sides of the central plane of the drum 35. The slide bars are adjustable longitudinally of the beam 103 for the purpose of positioning the ply turn-up tools accurately with relation to the opposite ends of the drum 35.

Each of the slide bars 106, at its end farthest from the other slide bar, has a single-acting fluid pressure cylinder 108 mounted thereon, and at its other end has a fluid pressure cylinder 109, the axes of said cylinders being horizontally disposed, but offset laterally from each other. The cylinders 109 are arranged with their closed ends confronting each other, and with piston rods projecting from their opposite ends. Each cylinder 109 is formed, at its end from which its piston rod projects, with a pair of upwardly and axially extending arms 110, 110 in the free ends of which is journaled a pivot pin 111, and mounted upon the latter between said arms is a gear segment 112 that it meshed with rack teeth 113 formed on the upper face of a square piston rod 114 of the cylinder 109. The outer end of the rod 114 is provided with an extension 115 that moves in a slideway formed in a piston rod support 116 that is mounted on slide bar 106. The arrangement is such that when the cylinder 109 is charged, the piston rod 114 thereof is projected outwardly, thereby turning the gear segment 112 angularly from the position shown in full lines in Figures 9 and 10 to the position shown in broken lines in Figure 9, and in full lines in Figure 11. When the cylinder 109 is discharged, the piston rod 114 is retracted by means of a tension spring 117 that is connected at one of its ends to a fixed point on the cylinder 109 and at its other end to a stud 118 that projects laterally from the piston rod near the outer end thereof. It is the gear segments 112 that carry the work-engaging tools of the ply turn-up devices.

To this end one of the radial margins of each segment 112 has a supporting pin or arm 120 mounted therein and disposed perpendicular to said margin, the latter being disposed in vertical position in the inoperative position of the device as shown in full lines in Figure 9 and in Figure 11. Mounted upon the supporting pin 120, near the free end thereof, is an adjusting block 121 that is adjustable axially and angularly of the pin 120, and adjustably carried by said block 121 for axial and angular adjustment thereon is the stem 122 of a tool holder 123, the latter carrying a flat, blade-like tool 124. The tool 124 has a notch 124a at one end and tail-like portion 124b at its other, there being a rounded lateral projection 124c near said notched end. The lateral projection 124c is beveled on one side of the tool and the tail portion 124b is beveled on the opposite side of the tool. The operative function of the tool 124 is best understood with reference to Figures 12 and 14 wherein it is shown in operative relation to the drum 35 and work thereon, the latter consisting of two under-bead fabric plies 125, and a tire bead 126 mounted upon the latter at the shoulder of the drum. The drum being rotated in the direction indicated by the arrow in Figure 14, angular movement of the gear segment 112 swings the supporting pin 120 in such a manner as to carry the tool 124 into engagement with the drum 35, the lateral projection 124c of the tool entering between the fabric plies 125 and the sloping shoulder of the drum on which they lie, and thereby turning the marginal portions of said plies outwardly onto the adjacent face of the bead structure 126, as is best shown in Figure 12. As is clearly shown in Figure 14, the tool 124 in operative position is disposed tangentially of the drum and the bead 126, so that the marginal portion of the plies 125 turned outwardly by the projection 124c of the tool 124 are further engaged by the tail portion 124b of the tool and folded farther about the bead 126, as the rotating drum moves the work thereon relatively of the said tool. Thus the fabric plies are in position to be engaged by a second tool of the ply turn-up device. The movement of the tool 124 toward the drum 35 initially is slow, with its final movement more rapid, so as more efficiently to engage the work on the drum, the said change in speed being effected by controlling the rate at which the cylinder 109 is charged.

The said second turn-up tool is a rotatable disc or roller 129 having a grooved perimeter shaped complemental to the transverse curvature of the tire bead 126 and adapted to complete the folding of the margins of plies 125 about said bead. For this reason it is necessary that the disc 129 initially engage the work after the latter has been engaged by the tool 124, and to this end means operating subsequent to the angular movement of the gear segment 112 is provided for moving the tool 129 into engagement with the work.

For supporting the tool 129, an adjusting block 131 is mounted upon supporting pin 120 between the segment 112 and the adjusting block 121 thereon, said block 131 being axially and angularly adjustable on said pin. The adjusting block 131 supports a swivel block 132 that is provided with a stem or post 133, the latter being adjustably clamped in said block 131. The swivel block is disposed on that side of the adjusting block 131 that is nearest the drum 35 when the turn-up device is in the operative positions shown in Figures 11 and 14, and the stem 133 of said swivel block is disposed at right angles to the pin 120. Swiveled in the swivel block 132, on an axis perpendicular to the stem 133, is the stem 134 of a clamp 135. Mounted for axial adjustment in the latter is an arm or shaft 136 that projects from both sides of said clamp and on one end thereof carries an adjustably mounted tool-block 137 upon which is swiveled the tool 129. A tension spring 138 connected at one of its ends to the tool-block 137 and at its other end to the adjusting block 121 yieldingly urges the structure carried by the swiveled clamp 135 to the inoperative positions shown in Figures 9 and 10. Movement of the said structure under the impetus of said spring is limited by a collar 139 that is mounted upon the arm 136 and which bears against the adjusting block 121 in the inoperative position of said structure.

Figure 14:
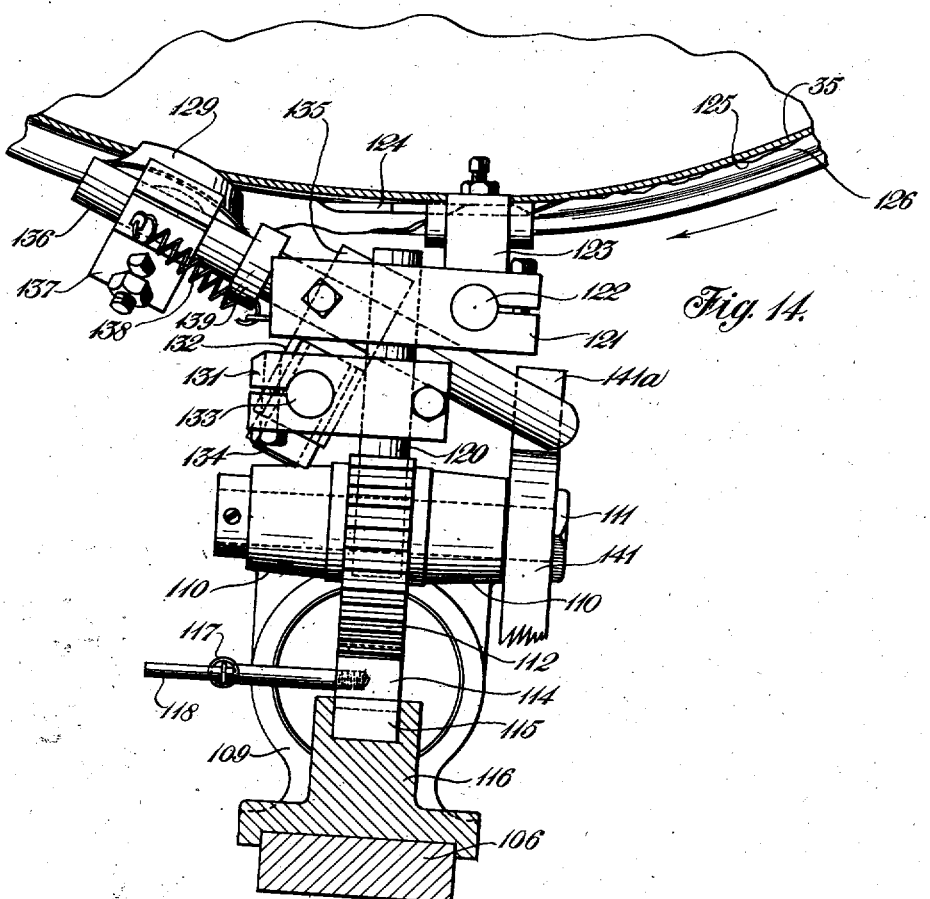
Figure 14 is a side elevation of a ply turn-up device, in operative position, as viewed from the right in Figure 1.
Figure 15:
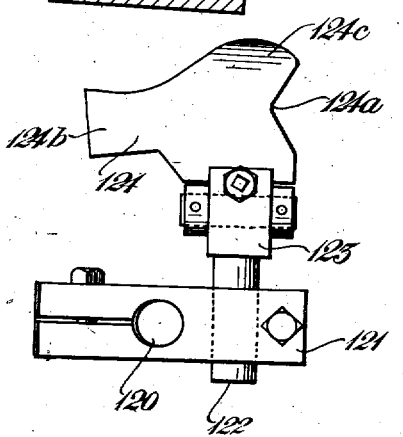
Figure 15 is a plan view of the turn-up tool shown in Figure 12, and its holder.

The arrangement is such that the structure mounted on the swivel block 132 is moved from the position shown in full lines in Figure 9 to the position shown in broken lines therein by the angular movement of gear segment 112, when moved counter-clockwise as viewed in said figure, which movement carries the rotary tool 129 to a position in laterally spaced relation to the end of the drum and the tire bead being built thereon. For subsequently moving the said tool into operative engagement with the tire bead, to press down the marginal portions of the fabric plies 125 thereon, a lever 141 is provided, which lever is pivotally mounted intermediate its ends upon the pivot pin 111, beside the rear supporting arm 110 of the latter. The upper end of the lever 141 is formed with a nose portion 141a, which normally is in the inoperative position shown in Figures 9 and 10, and is disposed in spaced relation to the shaft 136, at the end thereof remote from the tool 129, in both positions of the pin shown in Figure 9. The lever 141 is angularly movable upon its pivot, and when so moved the nose portion 141a thereof engages the adjacent end of the shaft 136 and moves the latter and the structures carried thereby angularly about the pivot consisting of the stem 134, with the result that the tool 129 is moved, against the tension of spring 138, into engagement with the bead portion of the work, as is shown in Figures 11 and 14. In Figure 13 the function of the tool 129 in rolling down the marginal portions of the under-bead plies 125 upon the bead 126 is clearly shown.

The moving of the lever 141 as described is effected by the fluid pressure cylinder 108, and to this end the piston rod 144 thereof (Figure 3A) has a clevis 145 adjustably affixed in its outer end, said clevis embracing the lever 141, below the pivot 111 thereof, and carrying a pin 146 that extends through a slot 147 disposed longitudinally in said lever. The arrangement is such that when the cylinder 108 is charged, its piston rod 144 is projected and swings the lever 141 angularly to operate the turn-up tool 129 as previously described. Upon discharge of the cylinder 108 retraction of its piston rod and the lever 141 is effected by means of a tension spring 148 that is connected at one end to the lower end of said lever and at its other end is connected to a fixed point (not shown) on the slide bar 106. Means by which the cylinder 108 is operated in determinate time relation to the operation of the cylinder 109 presently will be described.

The spring stitcher devices, the bead mounting devices, and the ply turn-up devices may be and preferably are operated automatically in the sequence mentioned, and to this end a suitable controller or timing device is provided, which device is located in the casing 150 mounted upon the front of the housing 21. Said controller may be of any standard or preferred construction, no novelty being claimed for it so that no detail description thereof need be given here. The said controller is electrically operated, and is set in operation by means of a switch button 151 on a switch box 152 that also is located on the front of housing 21. The switch box 152 also includes "forward" and "reverse" buttons 153, 154 that control the direction of rotation of the drum 35. A second switch box 155 mounted on the front of the housing 21 contains manually operable switches for effecting manual operation of the several devices of the apparatus when automatic operation is not desired.

The primary control of cylinders 109 is in the switch mechanism mentioned, but the control of the speed of admission of fluid thereto, and the control of the fluid pressure cylinders 108 is effected by other means under control of cylinder 109. To this end suitable toggle valves are mounted in the pipes that conduct fluid to said cylinders, which valves are operated in proper sequence by the movement of piston rod 114 of one of the cylinders 109, it being understood that both cylinders 108 and cylinders 109 are connected to supply pipes common to each pair of cylinders. The aforesaid valves are shown in Figure 1 wherein 158 designates a pilot valve in a high pressure fluid supply line connecting with cylinders 109, 159 designates a valve in the fluid supply line common to cylinders 108, and 160 designates an exhaust valve in the supply line of the cylinders 108. The operating toggle levers of valves 158, 159 are engaged by an operating block 161 that is slidably mounted for movement atop of the valves, the toggle levers extending through slots in said block and being so arranged therein as to operate in sequence when said block is moved. Thus when the block 161 is moved to the left as viewed in Figure 1, the lever of valve 158 first is operated, followed by valve 159, the arrangement providing delayed action of the latter. A somewhat similar operating block 162 is mounted atop of valve 160 in engagement with the toggle lever thereof. The blocks 161, 162 are moved to effect operation of the respective valves by means of the piston rod 114 of the cylinder 109 at the left of the apparatus as viewed in Figure 1, and to this end the stud 118, to which the spring 117 is connected, carries a block 163 that is disposed between the operating blocks 161, 162 and in alignment therewith. When the apparatus is in the inoperative position shown in Figure 1, the block 163 is in engagement with block 162 and the latter holds the valve 160 open so that cylinder 108 is in evacuated condition, the piston rod 144 of the cylinder being in retracted position under the force of tension spring 148. When the cylinders 109 are charged through the agency of the timing device, low pressure fluid admitted to them slowly moves their piston rods 114 outwardly, the first result being that block 163 moves away from block 162 and permits valve 160 to close the discharge port of cylinder 108. Subsequently block 163 engages block 161 and moves it to the left as viewed in Figure 1, the first result being to operate and open valve 158 and thereby admit fluid under high pressure to cylinder 109 so as quickly and strongly to move the piston rod thereof to fully projected position. The opening of valve 159 by the block 161 is slightly delayed following the opening of valve 158. Opening of valve 159 admits fluid pressure to cylinders 108 to project the piston rods thereof and effect the operations previously described. After a determinate time interval the timer releases the pressure in cylinders 109, and the springs 117 thereof retract their piston rods 114, with the result that the block 163 thereon is restored to point of starting. This moves said block against block 162 to open valve 160 and thereby to evacuate cylinders 108, the springs 148 thereof returning their piston rods to retracted position.

In the building of pneumatic tire casings with the apparatus described, after the under-bead fabric and the beads have been applied, and the margins of said plies have been turned up about the beads, the next operations are the applying of the over-bead fabric plies to the structure on the building drum, applying two chafer strips to the marginal portions of the over-bead plies and applying a tread reinforcing ply to the medial region thereof, and finally applying the tread slab to tire structure, said tread slab including sidewall material. The said constituent elements of the tire are applied thereto as the drum rotates, and they are drawn onto the drum from a supply rack that also carries the under-bead fabric plies 125 previously mentioned. The said supply rack is located at the rear of the apparatus and a brief description thereof subsequently will be given. After the over-bead fabric plies, the chafer strips, the tread reinforce, and the tread slab are on the drum, tread slab and sidewall structure require to be rolled down and the chafer strips and marginal portions of the over-bead fabric require to be rolled downwardly about the bead portions of the tire. The rolling down of the tread slab and the side walls may be performed concurrently since the devices for doing the same engage the work at different regions thereof, the fabric turn-down operation being performed immediately thereafter.

Figure 16:
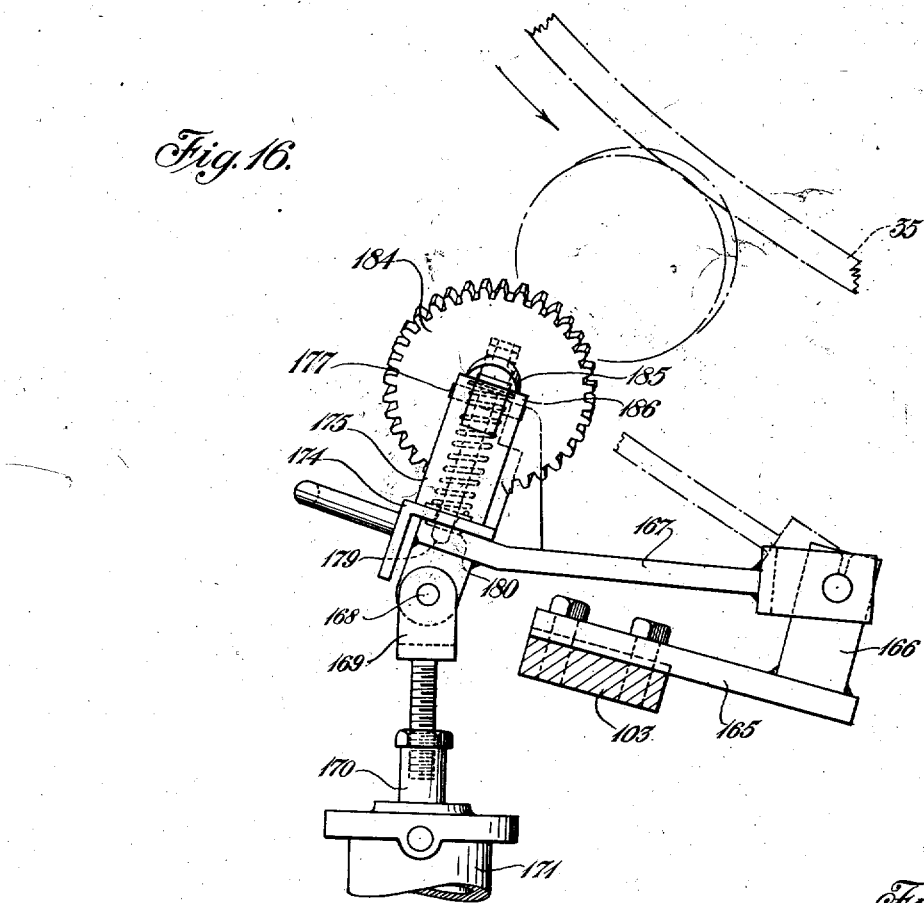
Figure 16 is a side elevation, on a larger scale, of the side wall rolling device of the apparatus, shown in inoperative position.
Figure 17:
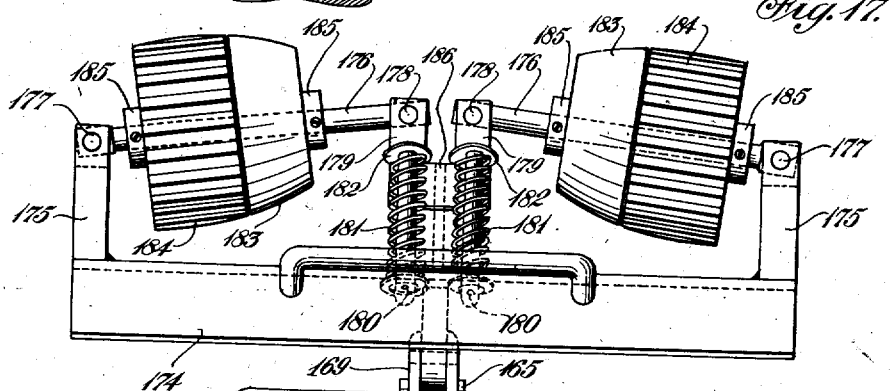
Figure 17 is a front elevation of the structure shown in Figure 16.

The apparatus for rolling down the sidewalls of the tire structure, which is shown in detail in Figures 16 and 17, comprises a supporting bracket 165 and is secured to the top of the beam 103, at the middle thereof, between the adjacent ends of the slide bars 106, said bracket extending rearwardly from said beam and being provided with an upstanding arm 166 which pivotally supports one end of a forwardly extending slightly angular bar 167. The free end of the latter is pivotally connected at 168 to a clevis 169 that has a downwardly extending stem that is threaded into the outer end of the piston rod 170 of a vertically disposed double acting fluid pressure operated cylinder 171. The arrangement is such that charge and discharge of the cylinder 171 moves the bar 167 up and down angularly about its pivotal connection with the arm 166. The cylinder 171 is pivotally supported at its lower end upon a bracket 172, Figures 1 and 2, that is mounted upon the rail-supporting bracket 61 of the bead placing device, and extends forwardly therefrom, the arrangement enabling the cylinder to tilt to conform to the arcuate movement of the bar 167.

Secured to the outer end of the bar 167 and disposed transversely thereof is a narrow supporting plate 174, and rising from each end thereof are respective arms 175, 175, the upper ends of the latter pivotally supporting respective spindles 176 that are attached at one end thereto by pivot pins 177. The other ends of spindles 176 are pivotally connected at 178 to the upper ends of respective spring pins 179, the lower ends of the latter slidably extending through respective apertures in the plate 174 and retained therein by cotter pins 180 or the like extending through their end portions below said plate. Compression springs 181 mounted upon the respective pins 179 between the plate 174 and washers 182 at their upper ends yieldingly resist downward movement of said spring pins. Journaled on each spindle 176 are two work-pressing rollers 183, 184 respectively of which rollers 184 are disposed near the pivots 177 of the spindles, the rollers of each pair substantially abutting each other and being retained in proper position on the spindles by collars 185 on the latter. The perimeters of the rollers 183, 184 are somewhat arcuate in an axial direction, and the rollers 184 have a deeply knurled or toothed surface. When the device is elevated by the operation of cylinder 171, from the position shown in full lines to the position indicated in broken lines in Figure 16, each pair of rollers 183, 184 comes into contact with the tread and sidewall slab of a tire structure being built on drum 35, laterally of the medial region of said slab. The charging of the cylinder 171 to raise the rollers 183, 184 is effected slowly, and the yielding supports at the adjacent ends of the spindles 176 enable the rollers to rock on the sidewall portions of the tread slab so that engagement of the rollers with said sidewall portions is progressive and toward the lateral margins of the slab. The function of the sidewall rollers is to assist in the prevention of bulges or buckles in the sidewall portions of the tread slab as the latter is rolled down concurrently therewith by a tread stitching device presently to be described. The drum 35 rotating in the direction indicated by the arrow in Figure 16 exerts a rearwardly directed strain upon the pins 179, so that lateral support is required for them. To this end a small backing plate 186 is provided on the bar 167, said plate being positioned at the rear of the pins 179 so that collars 182 on said pins bear against said plate.

The tread stitching device of the apparatus is located rearwardly of the sidewall rolling device previously described, as will be apparent from reference to Figure 2, and is shown in detail, on a larger scale, in Figures 18 to 20 inclusive, to which reference now is directed. Said tread stitcher comprises a frame structure that is designated as a whole by the numeral 189, said frame being mounted upon bed plate 20 beneath the drum 35, rearwardly of the vertical axial plane of the latter. Said frame comprises lateral members 190 at opposite ends thereof, which members are disposed obliquely with relation to the bed plate 20, and are positioned radially with relation to the axis of drum 35. The lateral members 190 are of channel shape with their channelled faces confronting each other, there being a tie plate 191 connecting the lower ends of said members. Slidably mounted in the channel of each member 190 for movement longitudinally thereof is an elongated slide bearing 192, and the latter are connected to each other by a horizontal tie bar 193. Mounted on the latter at the middle thereof is a coupling member 194 that is adjustably connected to the piston rod of a double acting fluid pressure cylinder 195 by means of an adjusting screw 196. The cylinder 195 is mounted upon the tie plate 191, and its axis is disposed radially of the drum 35, the arrangement being such that the slide bearings 192 are raised and lowered in unison as opposite ends of the cylinder 195 are alternately charged and discharged. For charging the lower end of cylinder 195 to raise said slide bearings, a foot-operated valve 197 is mounted upon the tie plate 191, said valve also controlling the concurrent charging of the lower end of cylinder 171, but more slowly due to the interposition of a speed control valve (not shown).

Mounted upon the confronting faces of the slide bearings 192, 192 are respective brackets 200, each of which is provided with a stud 201 that projects laterally parallel to the tie bar 193. Mounted upon each stud 201 is a spacer collar 202, and a hinge bracket 203, there being a plate 204 carried by said hinge brackets. A stop plate or abutment 205, Figure 18, is secured to the under side of the latter, in the middle thereof. The lateral members 190 are connected by an upper cross piece 206 to the middle of which is secured an internally threaded fixture 207 having an adjustable stop-screw 208 threaded therein, the stop plate 205 of the plate 204 resting upon said stop-screw 208 in the inoperative position of the device shown in Figures 18 and 20. Since the brackets 200 are secured to the slide bearings 192 and the stop-screw 208 is secured to a stationary frame member, it will be apparent that the plate 204 will tilt angularly about the pivot studs 201 whenever the slide bearings are moved upwardly.

The upper end of each slide bearing 192 is formed with a suitable longitudinally disposed slideway in which is mounted a slide 210 that normally is urged upwardly against an end cap by a compression spring 211 mounted beneath it in said slideway. Non-rotatably supported at its respective ends in said slides is a horizontal bar or screw 212, the upwardly presented half of which is formed with screw threads 213, 213, of which those at one side of the middle are right-hand threads and those at the other side of the middle are left-hand threads. The screw 212 is formed with a flange 214 at its middle. Mounted upon the screw 212, at each side of the medial flange 214 thereof, are respective axially threaded nuts 215, the confronting end faces of which are provided with discs 216 that constitute work-engaging tread stitching tools. Each nut 215 is backed by a thrust bearing 217 on which is mounted a thrust disc 218, and secured to the latter is the small end of a tapered compression spring 219 that is mounted upon the screw 212, the large end of said spring being secured to a spring disc 220 that is non-rotatably mounted upon the screw 212 at the outer end thereof adjacent the slide 210.

The springs 219 normally urge the nuts 215 and discs thereon toward juxtaposition at the middle of the screw 212, as shown in Fig. 18. The arrangement is such that when the slide bearings 192 are moved upwardly, the discs 216 are brought into engagement with the work on the drum 35, and rotated by reason of the rotation of the latter. Pressure of the discs 216 against the work assures that the nuts 215 have threaded engagement with the half-threads 213 of the screw 212, with the result that rotation of the drum in the direction indicated by the arrow in Fig. 20 effects rotation of the nuts 215 in the direction that threads them longitudinally of the screw 212, away from each other against the pressure of the springs 219, as shown in Fig. 19. Thus the tire structure on the drum is rolled down circumferentially progressively in a lateral direction toward its opposite margins. When subsequently the upper end of the cylinder 195 is charged to lower the slide bearings 192 and with them the disc tools 216, the latter move into abutting relation to the plate 204, as shown in Fig. 20, with the result that the nuts 215 are lifted relatively of the screw 212 sufficiently for the nut threads to move out of engagement with the screw threads 213, the springs 219 thereupon expanding and moving the nuts and the discs 216 thereon back to inoperative position at the middle of the screw, the discs sliding over said plate 204 during this operation.

At the time the discs 216 operate upon the work-structure on the drum, said work-structure comprises all of its constituent elements, as is best shown in Fig. 18. Thus, the work-structure includes the under-bead fabric plies 125 and tire beads 126 previously described, over-bead fabric plies 223, chafer strips 224, 224, tread reinforce 225, and the tread and sidewall slab 226. The function of the stitcher discs 216 is to roll said plies compactly together, and to fold the outer marginal portions of the fabric plies 223 and chafer strips 224 radially inwardly over the outer faces of the beads 126, as indicated in broken lines in Fig. 18. During the major portion of the tread stitching operation, the piston rod of the cylinder 195 is not in its fully projected position, and does not reach fully projected position until the discs 216 pass off the lateral margins of the work structure and thereby enable the slide bearings to be moved to their extreme elevated position by the said cylinder. In passing off of the lateral margins of the work structure the discs 216 fold the unsupported marginal portions of the over-bead fabric and the chafer strips radially inwardly.

The final movement of the slide bearings 192 to extreme position is utilized for effecting the reversing of the cylinders 195 and 171, and to this end a toggle valve 229 is mounted upon one of the lateral members 190 of the frame of the tread stitching device, the toggle or operating lever of said valve projecting into the path of a dog 230 that is mounted upon the slide bearing 192 in said frame member 190. The valve 229 is operatively connected to the fluid pressure lines that operate cylinder 195, the operation of said valve 229 serving to effect the discharge of the lower end of cylinder 195 and the charging of the upper end thereof, whereby the stitcher discs 216 are lowered away from the work and restored to the inoperative position shown in Fig. 18. The descending movement of the slide bearings 192 also is utilized to effect the subsequent operation of tucking the over-bead plies 223 and chafer strips 224 inwardly about the tire beads, which operation is effected by devices presently to be described. Said devices are set in operation and continue to operate for a determinate time interval under control of an electrically driven timing device (not shown), which timing device is set in motion by the closing of an electric switch 232, the device being self-stopping after the ply turn-down devices have executed a cycle of operation. The switch 232 is mounted upon a bracket on the frame member 190, below valve 229, and has a hinged operating lever 233 that projects into the path of a dog 234 mounted upon slide bearing 192. The hinged lever 233 is so arranged that the dog 234 will move past the same without operating the switch during the rising movement of the slide bearing, the switch being operated by the dog during descent of the slide bearing. The arrangement is such as automatically to initiate the succeeding operation on the work structure as the tread stitching operation is concluded.

The ply turn-down devices that perform the final tire building operation are two in number, and are positioned at opposite ends of the drum 35 so as to operate on the material over the ends of the drum. The turn-down devices are shown in Figs. 1, 2, and 4, and on a larger scale are shown in detail in Figs. 6 and 7. Each of the ply turn-down devices is mounted upon a base casting or standard 238, and the latter are mounted upon the respective slides 77 so as to be adjusted toward and from the building drum 35 concurrently with the spring stitcher devices previously described. The two ply turn-down devices are of identical construction so that a description of one of them will be sufficient.

The top of each standard 238 is formed with a slideway 240 in which is mounted a slide block 241, the said slideway being disposed at an angle to the direction of movement of the slide 77. The arrangement is such the slide block 241 is movable obliquely toward and away from the shoulder on the end of the adjacent tire building drum 35, as is best shown in Fig. 6. For so moving said slide block a double acting fluid pressure operated cylinder 242 is mounted in horizontal position upon the standard 238, at the end of slideway 240 that is remote from drum 35, the piston rod 243 of said cylinder extending into said slideway and being connected to the adjacent end of the slide block 241. The charging and discharging of the opposite ends of the cylinder 242 are controlled by the previously mentioned timing device (not shown). Mounted upon the top of the slide block 241 is a stitcher slide 244 that comprises an upstanding portion disposed substantially entirely at one side of the central vertical plane of the said slide block.

Formed on a lateral face of the upstanding portion of slide 244, near the bottom thereof, is a clamping fixture 246 in which is adjustably mounted a tubular holder 247 that is disposed on a horizontal axis that is parallel to the slideway 240. Mounted in the holder 247 and projecting therefrom toward the drum 35 is a spring-backed stud 248, the outer end of which carries a rotatable stitcher disc 249. A pin 250 in stud 248 projects laterally into a slot extending longitudinally of holder 247 for preventing angular movement of the stud in the holder, while enabling the stud to move axially, relatively of the holder. Another rotatable stitcher disc 252 is journaled on the outer end of an arm 253 that is pivotally mounted upon a pivot block 254 that is carried by the upstanding portion of slide 244 and projects laterally therefrom. Between the block 254 and the disc end of the arm 253, the latter is received in and guided by a horizontal slot 255, Fig. 7, formed in a lateral flange 256 on the upstanding portion of slide 244. The arm 253 normally is urged into said slot 255 by a tension spring 257 that is connected at one end to a bracket 258 secured to said arm and at its other end is secured to a fixed point on the upstanding portion of slide 244. The end of the arm 253 that is remote from the stitcher disc 252 carries a cam roller 259 on the under side thereof, which roller is adapted to cooperate with a face cam 260 that is adjustably mounted in a stationary upstanding bracket 261 that is mounted upon the standard 238. The forward end of the cam 260 is beveled, as shown in Fig. 6, and the cam roller 259 is moved off the beveled end of the cam in the operative position of the device, as the cylinder 242 moves the slide 244 and parts carried thereby forwardly toward the drum 35. When the cam roller 259 is on cam 260, the angular position of the arm 253 is such that its free end is moved somewhat outwardly from the bottom of its slot 255, against the tension of the spring 257, in which position of the arm the stitcher disc 252 on the end thereof will approach the drum 35 laterally of the shoulder thereof, as the slide 244 moves toward the drum. When the cam roller 259 moves off the cam 260 at the limit of the operative movement of the slide, the spring 257 swings the arm 253 on its pivot into the bottom of slot 255, thus moving the stitcher disc 252 on an arc into engagement with the tire structure on the drum.

A third rotatable stitcher disc 264 is journaled on the outer end of an arm 265 that is pivotally mounted upon a pivot block 266 that is carried by the upstanding portion of the slide 244, above the similar block 254. Between the block 266 and the disc-end of the arm 265, the latter is received in and guided by a horizontal slot 267 in the flange 256 of slide 244. The end of the arm 265 that is remote from the stitcher disc 264 is pivotally connected by the means of links 268 to a stud 269 that is secured to the outer end of the piston rod 270 of a double acting fluid pressure operated cylinder 271, the latter being mounted upon the upstanding portion of slide 244 with its piston rod projecting therethrough. Thus by charge and discharge of opposite ends of the cylinder 271 the arm 265 may be moved angularly about its pivot on the block 266 to swing the stitcher disc 264 in an arc similar to the arcuate movement of disc 252 previously described, but to greater extent. Such movement of the disc 264 is necessary in order that it may reach its operative position against the inner circumference of the bead portion of a tire being built on drum 35, as shown in Figure 6.

When the slide 244 is in retracted position, the piston 270 of cylinder 271 also is in retracted position, and the disc 264 is disposed laterally of its operative position. This position of the disc 264 is maintained until the slide 244 is moved toward the drum 35 and substantially reaches the operative position shown in Fig. 6, whereupon the rear end of cylinder 271 is charged to project the piston rod 270 and thereby to swing the arm 265 angularly to move disc 264 into engagement with the work. The charging of the rear end of cylinder 271 is effected in determinate time relation to the movement of the slide 244, and to this end a toggle valve 274, that controls the admission of fluid to the rear end of cylinder 271, is mounted upon a supporting bracket 275 on the side of standard 238, the operating lever of said valve 274 projecting into the path of a pivotally mounted dog 276 carried by a bracket 277 projecting laterally from the arm 265. The arrangement is such that when the slide 244 is moved toward the drum 35, the dog 276 will engage and tilt the toggle lever of valve 274 to charge the rear end of cylinder 271. The timing device (not shown) that controls the reversing of cylinder 242 also controls the reversing of cylinder 271, and the front end of the latter is charged, to effect arcuate movement of the disc 264 away from the work, immediately prior to the charging of the front end of cylinder 242 to retract the slide 241. As the latter is retracted, the pivotal mounting of the dog 276 enables it to tilt as it passes over the toggle of valve 274, without operating said valve.

The stitcher discs 249, 242, and 264 are arranged to engage a tire structure being built on drum 35, at the bead portion of said tire structure, and to fold the marginal portions over the over-bead fabric plies 223 and chafer strip 224 inwardly about said bead portion, as is clearly shown in Fig. 6. This folding of the marginal material is progressively effected by the stitcher discs, the marginal material engaging said discs in the order named as the drum rotates in the direction indicated by the arrow in Fig. 7.

All of the various constituent elements of the tire structure on the drum 35, with the exception of the bead rings thereon, are withdrawn from a supply structure disposed at the rear of the tire building apparatus. The said elements of the tire structure are withdrawn from the supply structure by the pull of the rotating drum to which their leading ends have been attached, most of the building elements being carried by the supply structure in continuous lengths. The said supply structure which is shown in Figs. 21 to 24 of the drawings, is an improvement upon the stock supply structure constituting the subject matter of my earlier U. S. Patent No. 2,045,534, issued June 23, 1936.

As shown in said figures, the stock supply structure comprises an open frame or base structure 280 upon which is rotatably mounted a superstructure or turntable 281 that turns about an axis 282. Mounted upon the turntable 281 are four stock-supply stations designated A, B, and C, D respectively. Stations A and B are disposed diametrically opposite each other and are of identical construction, one of said stations storing rubberized fabric for the under-bead plies 125 of a tire and the other storing rubberized fabric for the over-bead plies 223 of a tire. Stations C and D are disposed diametrically opposite each other, 90° removed from stations A and B, and are of identical construction, each of them storing a single tread and sidewall slab 226. Means controlled by the operator of the apparatus is provided for indexing or rotating the turntable, 90° at a time, to bring the respective stations of the turntable into juxtaposition with the tire building drum 35, to enable withdrawal of stock from the respective stations as needed. As the various stations are depleted of stock, they are replenished during intervals when they are positioned 180° removed from the building drum. Since the stations A and B are identical and are substantially similar to the subject matter of my prior patent aforementioned, a brief description of one of them will suffice.

As is best shown in Fig. 24, fabric storage station A comprises an upright framework 284 in the rear of which is journaled transverse horizontal shafts 285, 286 that are positioned in the same vertical plane. Forwardly of said shafts are journaled two more horizontal shafts 287, 288 also disposed in the same vertical plane. Fixedly mounted upon the shafts 287, 288 are respective rollers 289, 290 upon which continuous lengths of tire building fabric may be wound, with a liner interwound therewith, one end of the liner being permanently secured to the roller. Assuming that station A stores the under-bead fabric plies 125, then roller 289 will store ply 125a thereof and roller 290 will store ply 125b thereof, said plies usually consisting of rubberized cord fabric cut on the opposite bias so that the cords thereof will intersect each other when the plies are superposed on each other on the drum 35. Fixedly mounted upon the shafts 285, 286 are liner rewind rollers 291, 292 respectively, of which roller 291 is adapted to rewind liner 293 as the latter is unwound from roller 289 during the withdrawal of fabric ply 125a from the latter. In like manner liner 294 is wound upon roller 292 as it is unwound from roller 290.

Means whereby the liner re-wind rollers are driven to wrap liners thereon is best shown in Figs. 21 and 22 wherein it will be seen that an end portion of each shaft 285, 286, 287, and 288 projects laterally of the framework 284 and has a peripherally grooved pulley mounted thereon, said pulleys being designated 296, 297, 298, and 299 respectively. Connecting pulleys 296, 298 is a metal torsion spring or tape 300 that is wound about each of them, clockwise about one pulley and counterclockwise about the other, and extending from pulley to pulley at an angle that is transverse to the angle of liner 293. In like manner the pulleys 297, 299 are connected by a torsion spring or tape 301. The arrangement is such that withdrawal of fabric from either roller 289, 290 will drive the respective rewinding rollers 291, 292 in the opposite direction so that the liners 293, 294 are wound thereonto. Whenever fresh fabric stock is fed onto storage rollers 289, 290 as presently will be explained, the withdrawal of liners 293, 294 from rollers 291, 292 will rotate them and their respective pulleys 296, 297 in the direction that rewinds the tapes 300, 301 thereonto. Thus no extraneous driving means is required for the re-wind rollers. In order to apply determinate tension to the strips 125a, 125b as they are withdrawn from rollers 289, 290, projecting end portions of the latter have brake shoes 303, 304 engaged therewith, said brake shoes being urged against said rollers by static counterweights 307, 308 respectively that are adjustably mounted upon the free end of respective pivoted arms 305, 306, the latter also carrying said brake shoes 303, 304.

As previously stated, the fabric strips 125a, 125b are fed onto the storage rollers 289, 290 while the storage unit is in the position of unit B as shown in Figs. 21 and 22, said rollers being power driven to wind the fabric thereonto. To this end the shafts 287, 288 have the ends thereof that are remote from pulleys 298, 299 provided with respective pulleys 310, 311 that have grooved peripheries adapted to receive a V-type endless transmission belt 312. The latter is trained about a relatively large idler pulley 313 that is journaled on a stub shaft 314 carried by a bracket 315 upon the top of the frame 284, and a relatively small driven pulley 316 that is journaled upon a stub shaft 317 that is suitably supported at the lower part of the frame 284. The pulleys 313 and 316 are disposed in the same vertical plane as the pulleys 310 and 311, and have their perimeters so disposed that the front reach of the belt 312 is vertically disposed, but normally is not engaged in the grooves of pulleys 310, 311 and consequently does not drive the same, notwithstanding that belt 312 is constantly driven. Because pulley 313 is larger than pulley 316, the rear reach of belt 312 is obliquely disposed and in substantial spaced relation to pulleys 310, 311. For driving pulley 316, a sprocket 318 is secured to the hub thereof, and trained about said sprocket is a chain 320 that also is trained about idler sprockets 321 and 322 rotatably mounted at the bottom of frame 284, and about a driving sprocket 323 on the shaft 324 of a gear reduction device 325 mounted upon the top of frame 284 said gear reduction device being driven by a motor 326, the latter being driven during operation of the apparatus so as to drive the belt 312.

In order that the belt 312 may drive the rollers 289, 290 as required, to wind tire building fabric thereon, means is provided whereby an operator may force said belt selectively into frictional driving engagement with the pulley 310 or 311. To this end a pair of electric solenoids 329 and 330 are mounted one above the other upon the frame 284, at the front thereof and on axially aligned vertical axes. The movable cores of the solenoids are pivotally connected to the free end of horizontal arms of respective bell cranks 331, 332 that are pivotally mounted at 333, 334 respectively on the frame 284, forwardly of the shafts 287, 288. The other arms of said bell cranks extend upwardly and have respective brackets 335, 336 pivotally mounted upon their free ends, each of said brackets carrying a pair of small rollers 337 that are disposed beside the front reach of the belt 312, in front of the pulleys 310 and 311. The solenoids are adapted to move the bell cranks so that the rollers 337 move in an arc about the axes 333 or 334 of said bell cranks, which arc is in the plane of the belt 312. The arrangement is such that when either solenoid 329 or 330 is energized to lift the core thereof, a pair of the rollers 337 are moved toward the pulley 310 or 311, first engaging the belt 312 and then forcing the latter locally into the peripheral groove of said pulley. Since the belt 312 is constantly driven, downwardly in the front reach thereof, the frictional engagement of the belt with the pulley will drive the shaft 287 or 288 of the pulley, and the stock roller thereon, in counter-clockwise direction as viewed in Fig. 24, thus enabling an operator to feed fresh stock into the supply roll. Rotation of the latter also draws liner from the liner rewind rolls 291, or 292 to be wrapped between the convolutions of the fresh tire building stock. Push buttons (not shown) mounted upon the frame 284 in convenient position for manual operation by the operator are provided for energizing the respective solenoids.

To facilitate the feeding of stock into the supply rolls thereof, and to guide the same to the drum 35 as it is withdrawn from said supply rolls, trays 340, 341 are provided, which trays are pivotally mounted, one above the other, at pivot points 342, 343 respectively on the frame 284. The said trays are disposed in front of the stock supply rolls, and in lowered position their free ends are disposed adjacent the drum 35, above the same, as is best shown in Figs. 21 and 22. The tops of the trays are provided with adjustable lateral guide flanges 344 to assure proper guiding of the fabric passing thereover, the fabric ply 125a using tray 348 and fabric ply 125b using tray 341. The trays are tiltable about their pivots to an elevated inoperative position when not in use, and are yieldingly held in elevated position by respective pairs of coiled tension springs 345, 346, one end of each pair of springs being connected to a tray at the lateral margins thereof, the other ends of the springs being connected to fixed points on the frame 284 at opposite sides thereof. In the lowered position of the trays the springs are disposed substantially in the planes of the trays so as not to exert an upward pull thereon.

As shown in Figs. 21 and 22, each of the tread slab storage structures C and D comprises an elongated plate 348 that is mounted upon the turntable 281 in overhanging relation to a lateral margin thereof, the plate being tilted so that its end nearest the axis of the turntable is substantially elevated as compared to the opposite end thereof. At the lower end of each plate 348 is an elevated cross-bar 349 supporting a pair of angularly depending guide rollers 350, 350 that are adapted to engage a tread and side-wall slab 226 on the plate 348, at the shoulders of the tread portion of said slab, to center the same and guide it accurately as it is withdrawn from its supporting plate onto the tire structure being built on drum 35. Also at the lower end of plate 348 is an anti-friction roller 351 over which the tread slab is drawn as it passes to said drum. The operator that replenishes the fabric supply in storage units A and B also positions the tread slabs on the plates 348 of units C and D, from which units they subsequently are withdrawn by the building drum 35. It will be understood that the turntable requires to be turned to a position wherein unit C or D is in the position of unit A as shown in Figs. 21 and 22, during the withdrawal of a tread slab.

The two chafer strips 224 and the tread reinforcing strip 225 of the tire are drawn onto the drum 35, by reason of the rotation of the latter, from supplies of said strip material located below the base structure 280, as is shown in Fig. 23. At the end of base structure 280 that is nearest drum 35 is fixedly mounted a guide tray 354 over which the said tread reinforcing strip and the chafer strips pass, the top of said tray being provided with suitable lateral guides (not shown) for said strips to guide them accurately onto said drum. At the work-receiving side of the tray 354 is a guide roller 355 over which the several strips pass as they are drawn onto the tray. Since the chafer strips and tread reinforce are relatively narrow as compared to body plies of fabric, and since they are usually bias cut and therefore readily extensible, means is provided for positively feeding said strips to avoid tension therein. For clearness of illustration, storage means for but one chafer strip is shown, the omitted structure being identical with that shown.

Mounted upon the floor below the base structure 280, at one side of the middle thereof, is a chafer strip support comprising a pedestal or post 358 having its upper end provided with a cross arm 359 carrying laterally projecting spindles 360, 361 at the respective ends thereof. Journaled upon spindle 360 is a supply reel 362 of the chafer strip material 224, which material is interwound with a liner 363. Journaled upon spindle 361 is a liner rewind reel 364, the latter being driven by the chafer strip 224 which passes once around the rewind reel, as shown in Fig. 23. The chafer strip upon being withdrawn from the supply reel 362 passes in succession about guide rollers 365, 366, and 367, driven feed roller 368, and floating compensator roller 369, thence passing to the guide roller 355 aforementioned. The feed roller 368 is fixed on a suitably journaled shaft 370 that also carries a worm gear 371, the latter being meshed with a worm 372 that is coupled to the shaft of an electric motor 373 that is mounted upon the under surface of the top of base structure 280. Driving of the motor 373 is controlled by a tiltable mercury switch 374 that is mounted upon a switch arm 375 that is pivotally mounted at 376 on a suitable floor bracket. One end of the arm 375 is heavier than the other so as normally to tilt downwardly, the free end of said heavier portion resting upon a slide 377 that carries the compensator roller 369, said slide being slidably mounted on a compensator rod 378 and guided thereby. The arrangement is such that when the switch 374 and roller 369 are in the positions shown in Fig. 23, switch 374 and the circuit of motor 373 are open and the motor is not running. Thus when chafer strip material 224 is drawn onto the drum 35, it causes the roller 369 and its slide 377 to rise, which rise continues until the switch arm 375 is tilted sufficiently to close the switch 375 and thereby to set the motor 373 in operation. The motor is thus caused to drive the feed roller 368, and the latter withdraws the chafer strip material from the supply reel 362 and feeds it into the loop or festoon in which the compensator roller 369 is located, such infeed being at greater linear speed than the speed of withdrawal of the strip material by the drum 35. Thus the roller 369 is caused to descend, with the result that eventually it effects the tilting of the switch arm 375 to open the switch 374 and stop the motor 373. The arrangement avoids the imposing of such strains on the strip material as would occur if the drum 35 was required to pull the strip material from the supply reel 362. It will be understood that the chafer strip feeding mechanism described is duplicated on the other side of the middle of base structure 280.

For supplying the tread reinforce strip material 225 to the drum 35, there is mounted upon the floor below the base structure 280, at the end thereof remote from said drum and at the middle thereof, a tread reinforce reel support comprising an upright post or standard 380 that carries laterally projecting spindles 381, 382. Journaled on the latter is a supply reel 383 of tread reinforce material 225 that is interwound with a liner 384. Journaled upon the spindle 381, above reel 383, is a liner rewind reel 385 adapted to rewind the liner 384 as the latter and the strip material 225 are drawn thereabout. Forwardly of the reel 385 is a shelf-like supporting tray 386 for the strip 225 that passes thereover from end to end thereof, there being guide rollers 387, 388 at the respective ends of the tray holding the material 225 thereon. In its movement toward the drum 35, the strip 225 after passing the guide roller 388 then passes over a feed roller 389, then under a compensating roller 390, then over a guide roller 391, after which it passes over the guide roller 355 aforementioned and onto the tray 354. The feed roller 389 is mounted upon a shaft 392 that also carries a worm gear 393, the latter being meshed with a worm 394 that is coupled to the shaft of an electric motor 395. Said motor is suspended from the top of the base structure 280 in the same manner as motor 373 hereinbefore described.

Control of the motor 395 is effected by a mercury switch 398 that is mounted upon a tiltable arm 399, the latter being pivotally mounted at 400. The compensating roller 390 is journaled in a vertically movable slide 401 that engages an end of the switch arm 399 to tilt the same as the roller 390 and its slide 401 rise and fall to determinate levels. The arrangement is substantially identical with that provided for each of the chafer strips 224, and it serves the same purpose, namely, to obviate the necessity of applying detrimental tension to the tread reinforcing strip.

Operation

The operation of the apparatus actually begins before the apparatus is in the inoperative position shown in Fig. 1, since the mounting of a tire bead 126 on the inner bead placing ring 45 must be done while the drum 35 is in collapsed position, as to enable the removal of a finished tire therefrom. After a tire bead is passed over the collapsed drum and positioned upon a margin of the ring 45, the drum 35 is expanded to annular form. The other tire bead 126 is then mounted upon the bead placing ring 46 while the latter is in the position shown in Fig. 1. Then with the storage rack in the position shown in Figs. 21 and 22, the operator first attaches the leading end of underbead ply 125a to the drum 35 and causes the latter to rotate one revolution to wrap the ply thereabout. After severing ply 125a the operator repeats the operation with ply 125b. After severing the latter the trays 340, 341 of the storage rack are lifted to inoperative position. The operator then starts the drive of the drum 35, and presses the timer button 151 of switch box 152 to effect automatically a series of operations upon the tire structure on the drum. The first operation of the series is the stitching down of the marginal portions of the under-bead plies 125 onto the lateral shoulders of the drum, which is effected by the spring stitchers shown best in Figs. 4 and 5. As soon as the spring stitchers return to inoperative position the cylinders 52, 65 are charged so as to move the bead-placing rings 45, 46 into engagement with the rotating drum 35, as shown in Fig. 8, to apply the bead structures 126 to the tire structure. Immediately thereafter the action of said cylinders is reversed to restore the bead placing rings to inoperative position, and the cylinders 109 of the ply turn-up devices are charged to effect the concurrent operation of the two devices, shown in Fig. 9 to Fig. 15 inclusive, that turn the marginal portions of the under-bead plies 125 outwardly about the beads 126. As soon as the ply turn-up devices return to inoperative position, it is preferable that the direction of the rotation of drum 35 be reversed and the spring stitchers be again briefly brought into operation to firmly roll the under-bead plies upon the beads. After this operation the drum comes to a stop.

The operator then turns the turntable 281 of the storage rack to the position where unit B thereof is disposed adjacent the drum 35, and then withdraws the over-bead fabric plies 223 therefrom and applies them to the drum in the same manner as used in mounting the under-bead plies 125. After the over-bead plies 223 are applied to the drum, the leading ends of the two chafer strips 224 and the tread reinforce strip 225 are adhered to the drum and the latter rotated one revolution to apply said strips about the drum. After said strips are severed, the turntable is turned 90° to bring unit C or D thereof into alignment with the drum, and the leading end of the tread and sidewall slab 226 on said unit is drawn onto the drum and adhered thereto. The drum is then rotated one revolution to draw the slab onto itself, the operator then manually splicing the ends of the slab. Thereafter the drum 35 is again driven, and the operator operates the valve 197 to charge the lower ends of cylinders 171 and 195 and thereby to raise the sidewall rollers 183, 184 and the tread stitching discs 216 into operative engagement with the slab 226. Rotation of the latter moves them laterally along the screw 213, and eventually they reach the ends of the tire structure on the drum and enable the slide bearing 192 to be projected outwardly by the cylinder 195 until it operates toggle valve 229, with the result that cylinders 171 and 195 are reversed and the sidewall rollers and the tread stitchers are lowered to inoperative position. Upon descent of the slide bearing 192, the dog 234 thereon operates switch 232, thus setting into operation a timing device (not shown) that controls the operation of the ply turn-down devices shown in Figs. 6 and 7. These devices fold the marginal portions of the chafer strips 224 and over-bead plies 223 inwardly about the beads of the tire, in the manner hereinbefore set forth. After the turn-down devices have operated for a determinate interval, the timing device effects their retraction to inoperative position. The operator then shuts off the motor 32 that drives the drum 35, and substantially concurrently applies braking force to the brake drum 38 by means of the lever 42, thus collapsing the brake drum and bringing it to rest. The finished tire may then be removed from the collapsed drum, thus completing a cycle of operation.

The invention includes automatically operating devices that reduce the manual labor required, increase the output of tires, and achieve the other objects set out in the foregoing statement of objects.

Modification may be resorted to without departing from the spirit of the invention, or the scope thereof as defined by the appended claims.

What is claimed is:

1. Tire building apparatus comprising a rotatable drum and means for rotating the same, a tread stitching device comprising a slide movable radially of the drum, laterally movable tread stitching discs carried by said slide, a single power means connected to said slide for moving it radially toward and away from said drum, and means operated by said radial movement of said slide as it attains its position nearest the drum as the result of the stitching discs passing off the work thereon for reversing said power means to retract the slide to inoperative position.

2. Tire building apparatus comprising a rotatable drum and means for rotating the same, a tread stitching device movable radially of the drum, ply turn-down devices operable in unison upon a tire structure on the drum at the ends thereof, power means connected to the stitching device for projecting the stitching device toward the drum and retracting it therefrom, and means operated by the stitching device as it is retracted from the drum for initiating a cycle of operation of the ply turn-down devices.

3. Tire building apparatus comprising a rotatable drum and means for rotating the same, and a ply turn-down device adapted to operate upon a tire structure on the drum at one end thereof, said device comprising a slide having rectilinear movement toward and away from the drum, an arm pivotally mounted upon said slide, a tool mounted on the end of the arm nearest the drum, a power operated device engaging the other end of said arm for swinging it on its pivot, and means operated by the slide for putting said power operated device into operation at a determinate point in the movement of the slide toward the drum.

4. A combination as defined in claim 3 in which the power operated device is a fluid pressure cylinder and the means for actuating the cylinder is a stationary valve, and a dog moving with the slide for operating said valve.

5. Tire building apparatus comprising a rotatable drum and means for rotating the same, and a ply turn-down device adapted to operate upon a tire structure on the drum at one end thereof, said device comprising a standard, a slide therein, a fluid pressure cylinder on the standard connected to said slide for moving the same toward and away from said drum, an arm pivotally mounted upon said slide, a tool mounted upon the end of the arm nearest the drum, a fluid pressure cylinder mounted upon the slide and operatively connected to the other end of said arm, a valve mounted upon the standard and controlling the charging of one end of the arm-operating cylinder, and a dog moving with said slide adapted to operate said valve when the slide is moving toward the drum.

HORACE D. STEVENS.

CERTIFICATE OF CORRECTION.

Patent No. 2,381,379. August 7, 1945.

HORACE D. STEVENS.

It is hereby certified that error appears in the printed specification of the above numbered patent requiring correction as follows: Page 8, second column, line 22, for the words "portions over" read --portions of--; line 32, for "thereon" read --thereof--; and that the said Letters Patent should be read with this correction therein that the same may conform to the record of the case in the Patent Office.

Signed and sealed this 11th day of December, A. D. 1945.

Leslie Frazer (Seal) First Assistant Commissioner of Patents.

mounted on the end of the arm nearest the drum, a power operated device engaging the other end of said arm for swinging it on its pivot, and means operated by the slide for putting said power operated device into operation at a determinate point in the movement of the slide toward the drum.

4. A combination as defined in claim 3 in which the power operated device is a fluid pressure cylinder and the means for actuating the cylinder is a stationary valve, and a dog moving with the slide for operating said valve.

5. Tire building apparatus comprising a rotatable drum and means for rotating the same, and a ply turn-down device adapted to operate upon a tire structure on the drum at one end thereof, said device comprising a standard, a slide therein, a fluid pressure cylinder on the standard connected to said slide for moving the same toward and away from said drum, an arm pivotally mounted upon said slide, a tool mounted upon the end of the arm nearest the drum, a fluid pressure cylinder mounted upon the slide and operatively connected to the other end of said arm, a valve mounted upon the standard and controlling the charging of one end of the arm-operating cylinder, and a dog moving with said slide adapted to operate said valve when the slide is moving toward the drum.

HORACE D. STEVENS.

---

CERTIFICATE OF CORRECTION.

Patent No. 2,381,379.   August 7, 1945.

HORACE D. STEVENS.

It is hereby certified that error appears in the printed specification of the above numbered patent requiring correction as follows: Page 8, second column, line 22, for the words "portions over" read --portions of--; line 32, for "thereon" read --thereof--; and that the said Letters Patent should be read with this correction therein that the same may conform to the record of the case in the Patent Office.

Signed and sealed this 11th day of December, A. D. 1945.

Leslie Frazer (Seal)   First Assistant Commissioner of Patents.